US012471749B2

(12) United States Patent
Jorna

(10) Patent No.: US 12,471,749 B2
(45) Date of Patent: Nov. 18, 2025

(54) SYSTEM AND METHOD FOR CARRYING OUT AN ANIMAL-RELATED OPERATION, AND IN COMBINATION, A BARN FOR KEEPING ANIMALS AND A SYSTEM OF THIS KIND

(71) Applicant: LELY PATENT N.V., Maassluis (NL)

(72) Inventor: Harm Jorna, Gouda (NL)

(73) Assignee: LELY PATENT N.V., Maassluis (NL)

( * ) Notice: Subject to any disclaimer, the term of this patent is extended or adjusted under 35 U.S.C. 154(b) by 55 days.

(21) Appl. No.: 18/573,677

(22) PCT Filed: Jul. 7, 2022

(86) PCT No.: PCT/IB2022/056284
§ 371 (c)(1),
(2) Date: Dec. 22, 2023

(87) PCT Pub. No.: WO2023/285928
PCT Pub. Date: Jan. 19, 2023

(65) Prior Publication Data
US 2024/0298865 A1  Sep. 12, 2024

(30) Foreign Application Priority Data
Jul. 12, 2021  (NL) .................... 2028701

(51) Int. Cl.
*A47L 11/40* (2006.01)
*A01K 1/01* (2006.01)
(Continued)

(52) U.S. Cl.
CPC ........ *A47L 11/4091* (2013.01); *A01K 1/0128* (2013.01); *A47L 11/4005* (2013.01);
(Continued)

(58) Field of Classification Search
None
See application file for complete search history.

(56) References Cited

U.S. PATENT DOCUMENTS

| 2003/0094922 A1 | 5/2003 | Petersson et al. |
| 2017/0042115 A1* | 2/2017 | Van Den Beukel ..... A01K 1/01 |

(Continued)

FOREIGN PATENT DOCUMENTS

| CN | 207803091 U | 9/2018 |
| GB | 2529166 A | 2/2016 |

(Continued)

OTHER PUBLICATIONS

Google Patents translation of CN207803091U (Year: 2025).*
(Continued)

Primary Examiner — Eric W Golightly
(74) Attorney, Agent, or Firm — Birch, Stewart, Kolasch & Birch, LLP

(57) ABSTRACT

A system for carrying out an animal-related operation, including an autonomous vehicle and a charging station for charging a battery system of the vehicle. The charging station includes a transmitting body with a primary coil. The vehicle includes a receiving body with a secondary coil. The vehicle is maneuverable relative to the transmitting body of the charging station in such a way that the primary coil of the transmitting body and the secondary coil of the receiving body are mutually aligned in a charging state to transfer electrical energy wirelessly from the primary coil to the secondary coil for wireless charging of the vehicle's battery system. The system includes a cleaning device for cleaning at least the receiving body of the vehicle before the primary coil of the transmitting body and the secondary coil of the receiving body are mutually aligned in the charging state.

18 Claims, 16 Drawing Sheets

(51) Int. Cl.
  *B60L 53/124* (2019.01)
  *B60L 53/38* (2019.01)
(52) U.S. Cl.
  CPC .............. *B60L 53/124* (2019.02); *B60L 53/38* (2019.02); *A47L 2201/022* (2013.01); *B60L 2200/40* (2013.01)

(56) References Cited

U.S. PATENT DOCUMENTS

2019/0200510 A1* 7/2019 Chrysanthakopoulos ................... A01B 59/043
2019/0307106 A1 10/2019 Hartung et al.

FOREIGN PATENT DOCUMENTS

WO WO 2013/010785 A1 1/2013
WO WO 2017/069615 A1 4/2017

OTHER PUBLICATIONS

International Search Report, issued in PCT/IB2022/056284, dated Oct. 11, 2022, 3 pages.
Written Opinion of the International Searching Authority, issued in PCT/IB2022/056284, dated Oct. 11, 2022, 6 pages.

* cited by examiner

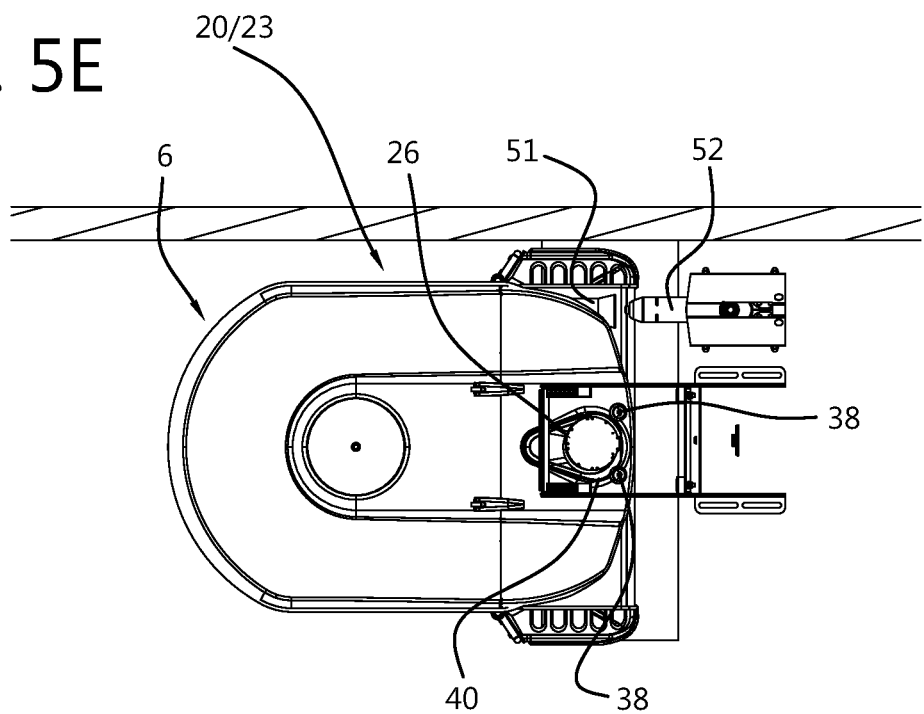

SYSTEM AND METHOD FOR CARRYING OUT AN ANIMAL-RELATED OPERATION, AND IN COMBINATION, A BARN FOR KEEPING ANIMALS AND A SYSTEM OF THIS KIND

CROSS-REFERENCE TO RELATED APPLICATIONS

This application is the National Phase of PCT International Application No. PCT/IB2022/056284 filed on Jul. 7, 2022, which claims the benefit under 35 U.S.C. § 119(a) to Patent Application No. 2028701, filed in the Netherlands on Jul. 12, 2021, which is hereby expressly incorporated by reference into the present application.

BACKGROUND

Technical Field

The invention relates to a system for carrying out an animal-related operation with an electrically driven, autonomous vehicle. The animal-related operation comprises in particular the removing of manure and/or urine from a floor in a barn for keeping animals, such as dairy cows, cows for meat production, pigs or goats. Moreover, "removing of manure" comprises not only the taking up of manure from a floor, for example through suction, picking up, scooping up and the like, but also the moving of manure over a floor with slotted holes, i.e. a "grid floor" or "slatted floor", in order to remove the manure to a manure reservoir under the floor. In the case of a grid floor, the manure can be removed from the floor by moving the manure through the slotted holes, so that the manure drops into the manure reservoir or manure pit under the floor. However, the invention is for example also applicable to an autonomous vehicle for the feeding of animals, such as with freshly-mown grass, or an autonomous vehicle for pushing feed toward a feed fence.

Discussion of the Related Art

The Lely Discovery 120 Collector® is known. This is an autonomous manure removing vehicle for removing manure from the floor of a barn. The vehicle is located in a very contaminated environment among the animals in the barn, as a result of which during operation the vehicle becomes very contaminated with manure and urine from the animals, and for example also with straw, sand and/or sawdust from the barn. The vehicle can find its way autonomously by means of an electronic control system with sensors, such as an ultrasonic sensor and a gyroscope. On the basis of the signals detected by the sensors, the control system controls a drive system with electric drive motors for the wheels of the vehicle. Consequently the vehicle can be steered and can travel along a desired route. The drive system and the control system are powered by a battery system on board the vehicle. The battery system is connected to electrically conductive charging strips which extend on the outside of the vehicle. In order to charge the battery system, the vehicle travels to a charging station with charging electrodes. In the charging station, the vehicle maneuvers in such a way that the charging strips on the outside of the vehicle make contact with the charging electrodes of the charging station and charging current can be supplied to the battery system.

However, the charging current is limited for reasons of safety. When the charging strips of the vehicle make contact with the charging electrodes of the charging station there is a risk of an electric spark, while explosive manure gases may be present in the vicinity of the charging station. The charging current is limited in order to prevent an electric spark leading to an explosion. However, the lower the charging current, the longer it takes to charge the battery system. Consequently, charging takes a relatively long time, which adversely affects the capacity (in liters of manure removed per day).

SUMMARY OF THE INVENTION

It is an object of the invention to provide an improved system for carrying out an animal-related operation, in particular removing manure from a floor in a barn with animals, wherein in particular charging of the autonomous vehicle takes less time and at the same time reliability remains ensured.

This object is achieved according to the invention by a system for carrying out an animal-related operation, in particular removing manure and/or urine from a floor in a barn for keeping animals, such as dairy cows, cows for meat production, pigs or goats, said system being provided with:
  an autonomous vehicle for carrying out the animal-related operation, in particular for removing manure and/or urine from the floor in the barn, wherein the vehicle comprises
    a drive system for driving the vehicle, said drive system being provided with at least one electric drive motor,
    an electronic control system, which is connected to the drive system for control thereof,
    a battery system for storing electrical energy, said battery system being connected to the drive system and the control system,
  a charging station for charging the battery system of the vehicle,
wherein the charging station comprises a transmitting body with a primary coil, and the vehicle comprises a receiving body with a secondary coil, and wherein the vehicle is maneuverable relative to the transmitting body of the charging station in such a way that the primary coil of the transmitting body and the secondary coil of the receiving body are mutually aligned in a charging state to transfer electrical energy wirelessly from the primary coil to the secondary coil for wireless charging of the battery system of the vehicle, and the system comprises a cleaning device for cleaning at least the receiving body of the vehicle, in particular comprising the removing of manure, mud, urine, straw, sand and/or sawdust, before the primary coil of the transmitting body and the secondary coil of the receiving body are mutually aligned in the charging state.

If it is desired to charge the battery system, the vehicle travels to the charging station. The charging station defines a charging position for the vehicle during charging of the battery system. If the vehicle is located in the charging position, according to the invention the primary coil of the transmitting body of the charging station and the secondary coil of the receiving body of the manure removing vehicle can be mutually aligned for wireless energy transfer between them.

In particular the transmitting body comprises a transmitting plate with the primary coil, and the receiving body comprises a receiving plate with the secondary coil. The transmitting plate and the receiving plate may each be formed by a round disk ("charging pad"), in particular with a diameter from 10 to 30 cm and/or a thickness from 1 to 2 cm. The transmitting body and the receiving body with such a "charging pad" may have another suitable shape, such as a droplet shape, a rectangular shape or some other. The primary and secondary coils may each comprise one or more induction coils, for example a stack of induction coils. The term "coil" is to be understood as meaning a device that comprises one or more induction coils.

With the wireless charging system according to the invention, the risk of an electric spark has disappeared. During wireless transfer of electrical energy from the transmitting body to the receiving body, there cannot be any spark formation, which in the presence of explosive manure gases could lead to dangerous situations. Therefore it is possible according to the invention to increase the charging current without compromising safety if the vehicle is configured as a manure removing vehicle. But even if the vehicle is configured for carrying out some other animal-related operation, such as mowing grass and then feeding the mown grass to animals or pushing feed toward a feed fence, charging of the autonomous vehicle takes less time, so that the vehicle has more time to drive around for carrying out the manure removal task or other animal-related task. This increases the capacity, for example in liters of manure removed per day for a manure removing vehicle.

At the same time, the reliability of charging the autonomous vehicle is guaranteed because fouling, such as manure, mud, urine, straw, sand and/or sawdust, is removed from the vehicle's receiving body before the primary coil of the transmitting body and the secondary coil of the receiving body are mutually aligned in the charging state. A manure removing vehicle is configured to travel autonomously among the animals in the barn. The receiving body of the manure removing vehicle becomes (very) contaminated with manure from the animals during use, often also in combination with urine, straw, sand and/or sawdust, which are on the barn floor. After a time the manure becomes hard ("caked"). There may also be pieces or lumps in the manure. Consequently the receiving body is usually covered with a layer of manure when the manure removing vehicle enters the charging station. Even if the vehicle is configured for some other animal-related operation, for example at least partly in the open air at a farmyard, the receiving body of the vehicle may get contaminated during use, such as with mud, grass, dust, possibly in combination with rain and the like.

However, this fouling impedes reliable and efficient wireless energy transfer. After all, it is desirable, in the charging state, to position the primary coil of the transmitting body close to the secondary coil of the receiving body, in particular at a mutual distance of for example max. 2 cm. According to the invention, the receiving body of the manure removing vehicle is cleaned by means of the cleaning device prior to alignment in the charging state, i.e. although the receiving body does not have to become completely clean, the cleaning device removes the fouling with manure and the like sufficiently from the receiving body for mutual alignment of the primary coil of the transmitting body and the secondary coil of the receiving body into the charging state.

In particular, the cleaning device is configured for cleaning an external surface of the receiving body, which faces the transmitting body in the charging state. After cleaning by the cleaning device, there is no longer any manure or other fouling to impede alignment in the charging state. Owing to the cleaning device, moreover, the vehicle entrains far less fouling into the charging station, so that the transmitting body of the charging station also becomes fouled less quickly. Consequently, with the cleaning device according to the invention, reliable and efficient wireless energy transfer is achieved.

In an embodiment the charging station comprises the cleaning device. Although it is possible to mount the cleaning device on the vehicle, it is preferable for the cleaning device to be arranged on the charging station. For the charging station, a reliable configuration of the cleaning device is possible. Moreover, the cleaning device is easy to install on the charging station.

It is possible according to the invention for the cleaning device to be configured for cleaning the receiving body while the vehicle enters the charging station. Consequently the fouling, such as manure and the like, is removed from the vehicle's receiving body just before the primary coil of the transmitting body and the secondary coil of the receiving body are mutually aligned in the charging state, i.e. the receiving body is cleaned as late as possible. It is then almost ruled out that after removal of the fouling, such as manure and the like, the receiving body immediately becomes contaminated again to the extent that the primary and secondary coil can no longer be aligned in the charging state. The cleaning device guarantees that wireless charging can take place reliably and efficiently.

In a preferred embodiment the receiving body is fixedly secured to the vehicle, wherein the transmitting body of the charging station is movable from a waiting state, by means of engagement with the receiving body of the vehicle that enters the charging station, in such a way that the primary coil of the transmitting body and the secondary coil of the receiving body are mutually aligned in the charging state, and wherein the cleaning device is configured for cleaning the receiving body, in particular comprising removing manure, before the receiving body of the vehicle engages on the transmitting body of the charging station, preferably in any case before the waiting state is reached. The transmitting body of the charging station is in particular pretensioned to the waiting state, for example by means of a spring device. The transmitting body of the charging station is movable from the waiting state, in which the transmitting body is for example suspended substantially freely movably on the charging station, through engagement with the receiving body of the manure removing vehicle that enters the charging station, until the transmitting body lies alongside or against the receiving body so that electrical energy is transferable wirelessly from the primary coil of the transmitting body to the secondary coil of the receiving body. If the vehicle is configured as a manure removing vehicle that travels among the animals in the barn, the vehicle is more liable to fouling with manure than the charging station, which is located in a fixed position in the barn. In addition the charging station is preferably screened with a fence, so that the animals in the barn cannot or can hardly come in or near the charging station. However, even if the vehicle is configured for some other animal-related operation, wherein the vehicle for example travels in the open air at a farmyard, the vehicle becomes fouled more quickly than the charging station. By achieving freedom of movement in alignment of the two charging bodies relative to each other through the transmitting body of the charging station and by fastening the receiving body rigidly to the vehicle, the adverse effect of fouling is minimized. This is favorable for reliability and service life.

In an embodiment the cleaning device is configured for cleaning the receiving body, in particular comprising removing manure, in such a way that the primary coil of the transmitting body and the secondary coil of the receiving body in the charging state are movable to a distance apart that is less than 5 cm, preferably less than 3 cm, such as substantially 2 cm or less. The cleaning device removes sufficient fouling from the receiving body before the transmitting body and the receiving body are aligned relative to each other, in such a way that wireless energy transfer is possible from the primary coil of the transmitting body of the charging station to the secondary coil of the receiving body of the vehicle. In this way, the battery system of the vehicle can be wirelessly charged reliably and efficiently.

In an embodiment the receiving body of the vehicle comprises a flat surface, which in the charging state faces the transmitting body of the charging station, and wherein the cleaning device is configured for cleaning at least the flat surface of the receiving body, in particular comprising removing manure. In particular, the transmitting body of the charging station and the receiving body of the vehicle each comprise a flat surface, which in the charging state face each other, and then for example lie alongside or against each other.

In a preferred embodiment the receiving body is fitted to an upper side of the vehicle and the flat surface of the receiving body faces upward, wherein the transmitting body of the charging station comprises a downward facing flat surface at a height that is adjusted to the height of the upward facing flat surface of the receiving body of the vehicle in such a way that these flat surfaces can be brought over or on each other in the charging state. In particular, the transmitting body and the receiving body are each located at a height of at least 30 cm, in particular at least 50 cm, above the floor.

Relatively little fouling collects on the upper side of the vehicle. Owing to the location of the receiving body on top of the vehicle, the receiving body is less liable to fouling and corrosion. Furthermore, the battery system can be charged regardless of whether the vehicle is delimited by a wall to the left or right in the charging station. The risk of damage through trampling by cows is also minimal if the vehicle is configured as a manure removing vehicle that travels among the animals in the barn. The transmitting body and the receiving body are configured and fitted to the charging station or the vehicle, respectively, so that by maneuvering the vehicle in the charging station these can be placed over or on each other.

Regardless of whether the receiving body extends on the upper side of the vehicle or otherwise, such as on a side wall or front of the vehicle, the primary coil of the transmitting body and the secondary coil of the receiving body are preferably arranged along the flat surface. The cleaning device can remove fouling that is left behind on the flat surface of the receiving body simply and effectively, so that the primary coil of the transmitting body and the secondary coil of the receiving body can be aligned mutually in the charging state. In particular, sufficient fouling is removed to bring the flat surfaces of the receiving body and transmitting body close to each other in such a way that wireless charging is possible. In addition, this prevents the flat surfaces of the receiving body and transmitting body being at an angle relative to each other on alignment, for example as a result of pieces or lumps in manure that is present as fouling. After cleaning, the flat surfaces are substantially parallel to each other.

The cleaning device may be configured in various ways. In a preferred embodiment the cleaning device comprises a scraping element for scraping the receiving body, in particular the flat surface thereof. Scraping for cleaning works effectively. If the vehicle is configured as a manure removing vehicle, the scraping element is configured for scraping manure from the receiving body. The scraping element then scrapes or sweeps manure from the receiving body, which in practice has proved especially effective, even for removing hard manure that is "caked" on the receiving body.

The scraping element preferably comprises a flexible scraping edge that is configured to be in contact with the receiving body during scraping of the receiving body. The scraping edge is in particular configured for scraping fouling, such as manure and the like, from the flat surface of the receiving body as the vehicle travels into the charging station. The scraping edge may be substantially straight and/or run substantially transversely relative to the direction of travel of the vehicle that travels into the charging station. The scraping edge is for example adapted to deform elastically as the scraping edge moves over the receiving body to remove fouling. During contact with the receiving body, in particular the flat surface thereof, the scraping edge is bent and exerts a compressive force during scraping. While the bent scraping edge of the scraping element moves over the receiving body, fouling, such as manure and the like, is removed. The scraping element is resilient. If the scraping edge no longer makes contact, the scraping element bends back to the original shape. For example, the scraping element is made of a flexible plastic, which in particular comprises polyurethane. This material is durable and is especially suitable for removing fouling, such as manure, mud and the like.

The scraping element may be fastened rigidly to the charging station, wherein the scraping element is configured for cleaning the receiving body, in particular comprising the removing of manure, while the vehicle enters the charging station, before the receiving body of the vehicle and the transmitting body of the charging station are positioned relative to each other in order to align the primary coil and the secondary coil in the charging state. As a result it is almost ruled out that alignment in the charging state is adversely affected by fouling on the receiving body.

If the receiving body is fitted to an upper side of the vehicle it is preferable for the scraping edge of the scraping element to comprise a substantially horizontal bottom edge, which is located at a scraping height that is adapted to the height of the upward facing surface of the receiving body in order to scrape fouling from the receiving body as the vehicle travels into the charging station.

It is moreover possible that the receiving body of the vehicle, in particular the upward facing flat surface thereof, viewed in the direction of travel toward the charging station as the vehicle enters the charging station, is placed slanting downward relative to the horizontal. In this case, the transmitting body of the charging station, in particular the downward facing flat surface thereof, viewed in an opposite direction toward the vehicle, may extend slanting upward relative to the horizontal.

The transmitting body of the charging station is located at a height that is adapted to the height of the receiving body of the vehicle in such a way that by maneuvering the vehicle in the charging station, the transmitting body of the charging station is engageable by the receiving body of the vehicle and the transmitting body and the receiving body are movable over or on each other to transfer electrical energy wirelessly from the primary coil of the transmitting body to the secondary coil of the receiving body. Before the receiving body of the vehicle engages on the transmitting body of the charging station the obliquely rising receiving body moves, however, through under the bottom edge of the scraping element while the vehicle enters the charging station. As a result, the scraping element can scrape fouling from the receiving body very effectively.

In an embodiment, the cleaning device comprises a water device for application or supply of water to the vehicle's receiving body. For example, water may be sprayed on the flat surface of the receiving body before the scraping element scrapes over this flat surface in order to remove fouling. It is also possible for the water device to be configured to spray water at high pressure against the fouling on the receiving body in order to remove said fouling. In that case the scraping element is optional or the scraping element may be replaced with a brush element for brushing away fouling left behind after spraying. Obviously a brush element of this kind may be employed for removing fouling without supply of water.

As mentioned above, the system according to the invention is suitable in particular for the removing of manure and/or urine from a floor in a barn for keeping animals, such as dairy cows, cows for meat production, pigs or goats. In this case the vehicle is configured as a manure removing vehicle. The manure removing vehicle may be configured in various ways. In an embodiment, the manure removing vehicle comprises a manure slider or manure scraper for moving and/or scraping manure over the floor. During travel of the manure removing vehicle, the manure slider slides over the floor of the barn. The manure slider is in contact with the floor in order to move and/or scrape manure that is present thereon. With a solid barn floor, a quantity of manure is accumulated or pushed up in front of the manure slider, i.e. a "manure bath" forms in front of the manure slider. The manure removing vehicle may comprise a manure feed device for in-feed of manure from the floor and moving of the fed-in manure to a manure storage container. For example, the manure accumulated in front of the manure slider is sucked up or picked up, such as raised by a rotary feed, and stored temporarily in the manure storage container. In other words, as it travels over the floor the manure removing vehicle collects manure from the floor into the manure storage container.

The manure removing vehicle may further comprise a manure discharge opening for discharging manure from the manure storage container, which in particular is fitted at the bottom of the manure storage container. It is possible for the manure discharge opening to be combined with the manure feed opening, i.e. the manure feed opening and the manure discharge opening are formed by one and the same opening, or for the manure discharge opening to be a separate, second opening, which for example is closable by a controllable discharge valve. Once the manure storage container is full, the manure feed device stops the in-feed of manure and the manure removing vehicle travels to a dump in order to empty the manure storage container. The dump comprises a dump opening, which discharges into a manure reservoir.

The charging station may comprise the dump opening. In this case the charging station forms a dump at the same time, i.e. the battery system can be charged during dumping, which is efficient. Preferably the dump opening is arranged in the floor for dumping manure from the manure discharge opening of the manure storage container through the dump opening to a manure reservoir that extends under the floor. If the manure removing vehicle is located with the manure discharge opening above the dump opening, the manure is discharged from the manure storage container through the dump opening to the manure reservoir.

The charging station and/or the dump, each separately or combined, may also be located outside the barn. Obviously it is also very well possible that the charging station and the dump are separate from each other, i.e. the charging station is located at a distance from the dump. For example, the vehicle first travels to the dump to empty the manure storage container, and then from the dump to the charging station to charge the battery system. Moreover, the dump may be located in the open air, whereas the charging station is for example installed in the barn.

It is also possible according to the invention for the manure removing vehicle to be configured for application with a grid floor or slatted floor, i.e. a floor with slots and a manure reservoir or manure pit under the barn floor for receiving manure that is moved through the slots by the scraping action of the manure removing vehicle. In other words, during travel of the manure removing vehicle the manure slider slides over the barn floor to push the manure through the slots, which then drops into the manure reservoir under the effect of gravity. In this way the manure is removed from the grid floor.

The invention also relates to, in combination, a barn for keeping animals, such as dairy cows or cows for meat production, as well as a system as described above. In particular, the system is then configured for removing manure and/or urine from a floor in a barn for keeping animals, such as dairy cows, cows for meat production, pigs or goats. The manure removing vehicle and the charging station are then located for example in the barn, i.e. in the space for keeping animals. As already stated above, the charging station may, however, also be placed outside the barn.

The invention further relates to a method for carrying out an animal-related operation, in particular removing manure and/or urine from a floor of a barn for keeping animals, such as dairy cows, cows for meat production, pigs or goats, wherein use is made of a system as described above, and wherein the method comprises:

moving the autonomous vehicle, in particular over the barn floor to remove manure from the floor, moving the vehicle to the charging station, and wireless charging of the battery system of the vehicle in the charging station by wireless transfer of electrical energy from the primary coil of the transmitting body of the charging station to the secondary coil of the receiving body of the vehicle, wherein at least the receiving body of the vehicle is cleaned by means of the cleaning device, in particular comprising removing manure, before the primary coil of the transmitting body and the secondary coil of the receiving body are mutually aligned in the charging state.

If the vehicle is configured as a manure removing vehicle with a manure storage container for temporary collection of manure that is removed from the floor, and the manure removing vehicle travels to the dump in order to empty the manure storage container when this gets full, the battery system is in particular charged during and/or after dumping the manure.

The method according to the invention has the same technical effects and advantages as described above in relation to the system according to the invention.

BRIEF DESCRIPTION OF THE DRAWINGS

The invention will now be explained in more detail with reference to the appended figures.

FIGS. 5A-5E show top views of various steps in aligning a receiving body of the manure removing vehicle relative to a transmitting body of the charging station for the system shown in FIGS. 1-4.

FIGS. 8 and 9 show perspective views of the charging station of the system according to FIGS. 1-6, wherein FIG. 9 is partially cut away.

DETAILED DESCRIPTION OF THE EMBODIMENTS

Figure 1:
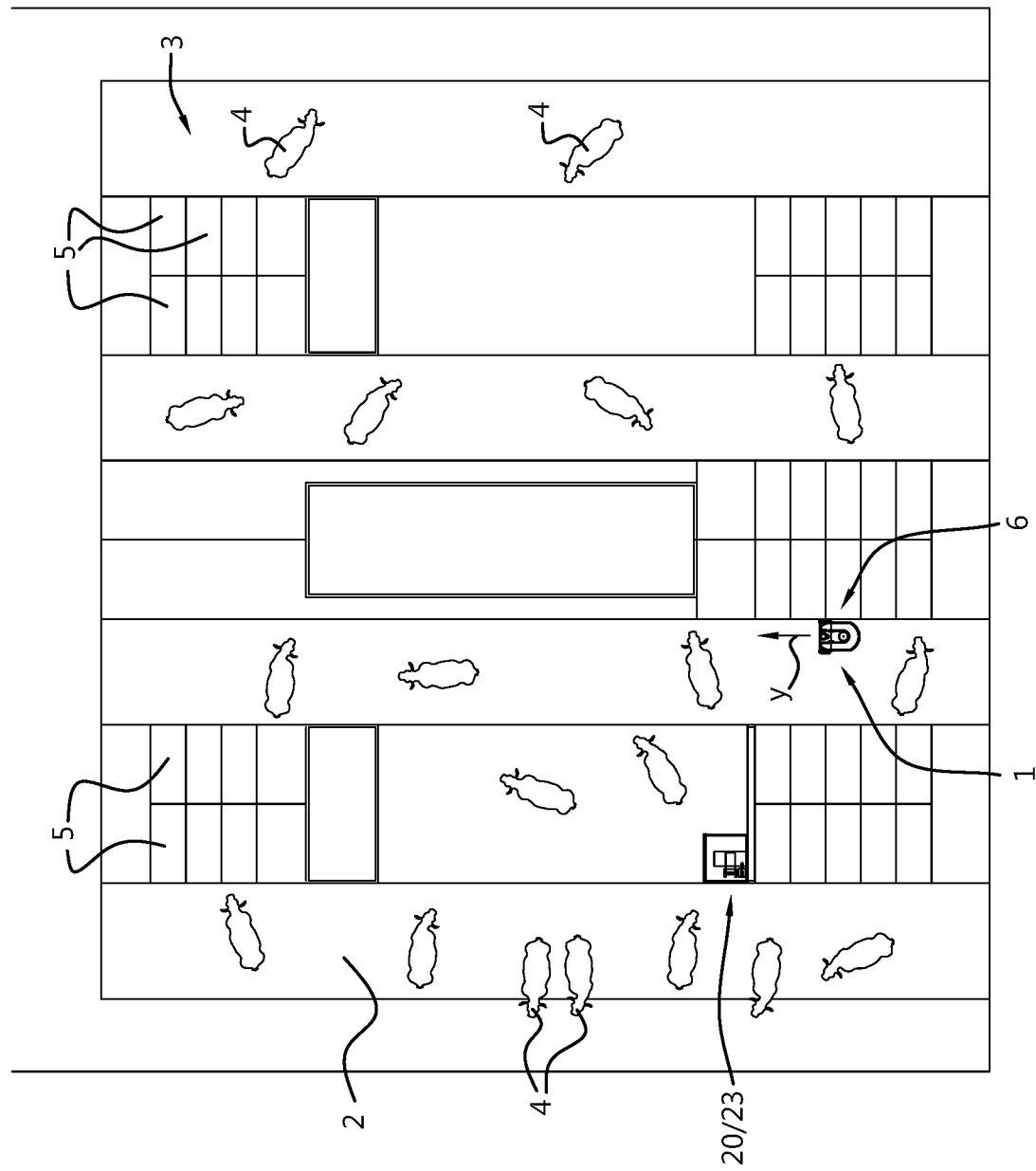
FIG. 1 shows a schematic top view of a barn with a system according to the invention, wherein the system is provided with an autonomous manure removing vehicle and a charging station that forms a dump.

FIG. 1 shows a system 1 for the removing of manure and/or urine from a solid floor 2 in a barn 3 that is configured as a typical loose housing barn for cows with cubicles 5. On the floor 2 there is manure and urine from the animals 4, and for example also straw, sand and/or sawdust, with which the cubicles 5 are lined. In this exemplary embodiment the system 1 comprises an autonomous manure removing vehicle 6 for removing manure. The manure removing vehicle 6 is located on the floor 2 among the animals 4. The manure removing vehicle 6 is supported on the floor 2 by means of two wheels 7 and a manure slider 8 (see FIGS. 3 and 4). The manure removing vehicle 6 may, however, also be supported in some other way, for example with a front wheel or a supporting element, such as a sliding block.

The manure slider 8 is configured for moving and/or scraping manure over the floor 2. During travel of the manure removing vehicle 6 over the floor 2, the manure slider 8 is in contact with the floor 2 in order to move and/or scrape manure that is present thereon. The manure slider 8 has for example a flexible bottom edge that scrapes over the floor 2. With the solid barn floor 2, a quantity of manure is then accumulated or pushed up in front of the manure slider 8, i.e. a "manure bath" forms in front of the manure slider 8. In this exemplary embodiment the manure slider 8 forms part of a manure feed device for feeding or introducing manure from the floor 2 and moving the fed-in manure to a manure storage container 16 (see FIG. 3), which defines an interior, in which manure can be collected temporarily.

The manure removing vehicle 6 is unmanned and self-propelled. The manure removing vehicle 6 can find its way autonomously by means of an electronic control system 9 (see FIG. 4) with sensors, such as an ultrasonic sensor and a gyroscope. On the basis of the signals detected by the sensors, the control system 9 controls a drive system with electric drive motors 10 for the wheels 7 of the manure removing vehicle 6. Because the wheels 7 are controllable independently of each other, the manure removing vehicle 6 can be steered and can travel a desired route through the barn 3.

The drive system and the control system 9 are supplied by a battery system 11 for storing electrical energy on board the manure removing vehicle 6. The battery system 11 comprises one or more rechargeable batteries, in particular 24V lithium batteries. The battery system 11 and electronic components of the control system 9, which are not resistant to manure or urine, are enclosed in a housing 12 of the manure removing vehicle 6. The housing 12 forms an electrical enclosure for housing electrical and/or electronic components of the manure removing vehicle 6.

In this exemplary embodiment this housing 12 is fitted substantially above and in front of the manure slider 8. The housing 12 comprises an access opening 14 at the top, for example for maintenance work. The access opening 14 is closable by a hinged cover 15. The cover 15 is movable between a closed state, in which the access opening 14 is closed by the cover 15, and an open state, in which the interior of the housing 12 is accessible via the access opening 14.

Figure 2:
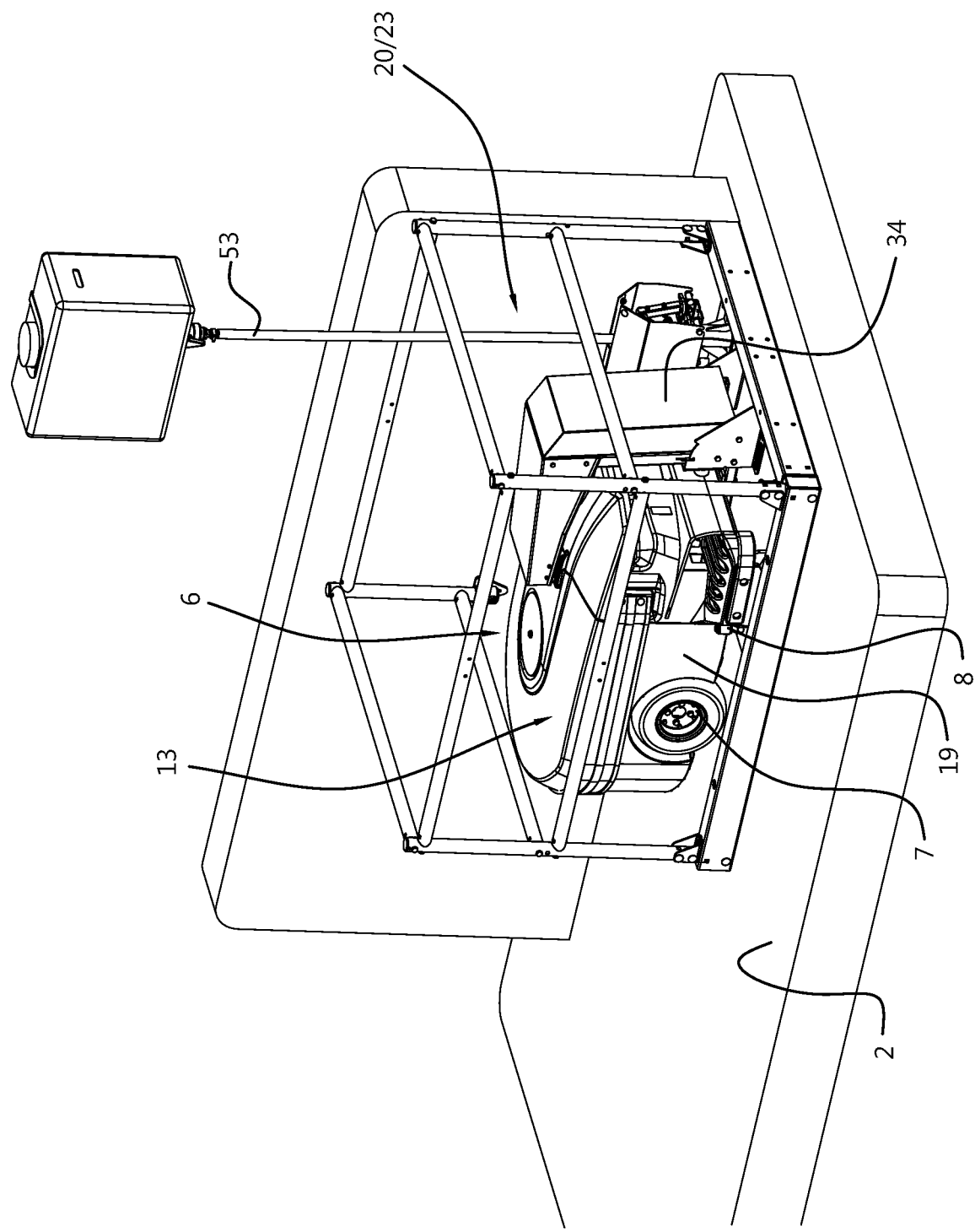
FIG. 2 shows a perspective view of the manure removing vehicle in the charging station of the system shown in FIG. 1.

The manure storage container 16 is located behind the housing 12. The manure storage container 16 comprises a bottom 17, which slants toward a manure feed and discharge opening 18, which is arranged at a lowest level of the bottom 17. The interior of the manure storage container 16 is further delimited by the inside of the two side walls 19 of the manure removing vehicle 6. In each side wall 19 there is a wheel housing for receiving a wheel 7 and the associated electric drive motor 10 (see FIGS. 2 and 4).

Although in this exemplary embodiment the manure storage container 16 has a single manure feed and discharge opening 18, i.e. manure taken up from the floor 2 is fed via this opening 18 to the manure storage container 16 and during emptying of the manure storage container 16 the collected manure leaves the manure storage container 16 via the same opening 18, it is also possible for the manure removing vehicle 6 to have two separate openings: a first opening for supply of manure and a second opening for discharge of manure.

During travel, manure collects on the floor 2 in front of the manure slider 8, which extends partially around the manure feed opening and outlet 18. A "manure bath" is formed in front of the manure slider 8. In this exemplary embodiment the manure feed device comprises a vacuum pump in order to generate a partial vacuum in the interior of the manure storage container 16, so that manure in the manure bath is sucked up from the floor 2 and flows via the manure feed and discharge opening 18 to the interior of the manure storage container 16. The manure is stored therein until the manure storage container 16 gets substantially full.

A manure feed device for sucking up manure is described in detail in WO 2013/010785 A1, the contents of which are incorporated by reference in the present description, and will not be explained further. It should be noted that the manure feed device may also have some other configuration. Instead of sucking up manure as described above, the manure feed device may for example comprise a mechanical pick-up mechanism for picking up or scooping up manure from the floor 2. Then the manure is for example moved upward by means of a rotor, and then ends up inside the manure storage container via a manure feed opening.

If the manure storage container 16 is full, the manure feed device stops the in-feed of manure and the manure removing vehicle 6 travels to a dump 20 in order to empty the manure storage container 8. At the dump 20, a dump opening 21 is installed in the floor 2, which opens into a manure reservoir or manure pit 22, which extends underneath the floor 2. If the manure removing vehicle 6 with the manure feed and discharge opening 18 is positioned above the dump opening 21 (see FIG. 3), the control system 9 switches off the vacuum pump, so that the partial vacuum in the interior of the manure storage container 16 disappears and the manure flows under the effect of gravity from the manure storage container 16, through the dump opening 21, and into the manure reservoir 22.

The discharge of the manure may, however, also have some other configuration. In the case of a manure removing vehicle that picks up manure and brings it via a rotor upward to the manure storage container, for example a separate manure discharge opening is provided, which is closable by a controllable discharge valve. At the dump, the discharge valve for example swivels away to open the manure discharge opening, so that the manure drops from the manure storage container into the manure reservoir.

Although the manure removing vehicle 6 described above is configured for receiving the manure and moving the received manure to a dump 20, the autonomous manure removing vehicle may, however, also be configured for moving and/or scraping manure through slot-shaped openings of a "grid floor" or "slatted floor" of the barn (not shown). In other words, in this case, during travel of the manure removing vehicle the manure slider scrapes over a grid floor of the barn to push the manure through the slots, which then drops into the manure reservoir under the floor under the effect of gravity.

The system 1 according to the invention further comprises a charging station 23 for wireless charging of the battery system 11 of the manure removing vehicle 6. If it is desired to charge the battery system 11, the manure removing vehicle 6 travels to the charging station 23. The charging station 23 defines a charging position for the manure removing vehicle 6 during charging of the battery system 11.

In this exemplary embodiment the charging station 23 comprises the dump opening 21, i.e. the charging station 23 and the dump 20 are integrated in this case. During discharge of the manure, the battery system 11 of the manure removing vehicle 6 can be charged. Obviously it is also possible that the charging station 23 does not form a dump. Also, the charging station 23 and/or the dump 20, each separately or combined, may be placed outside the barn 3.

Figure 9:
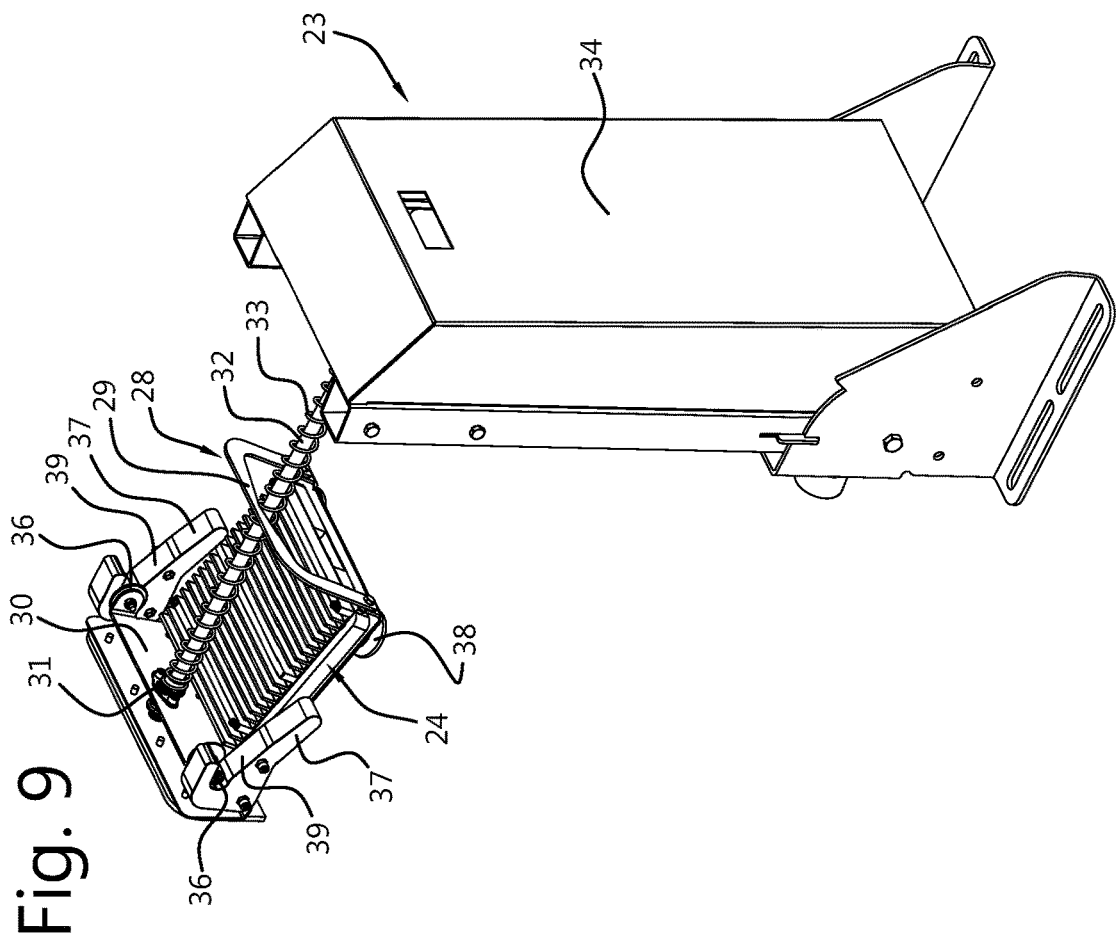
Figure 8:
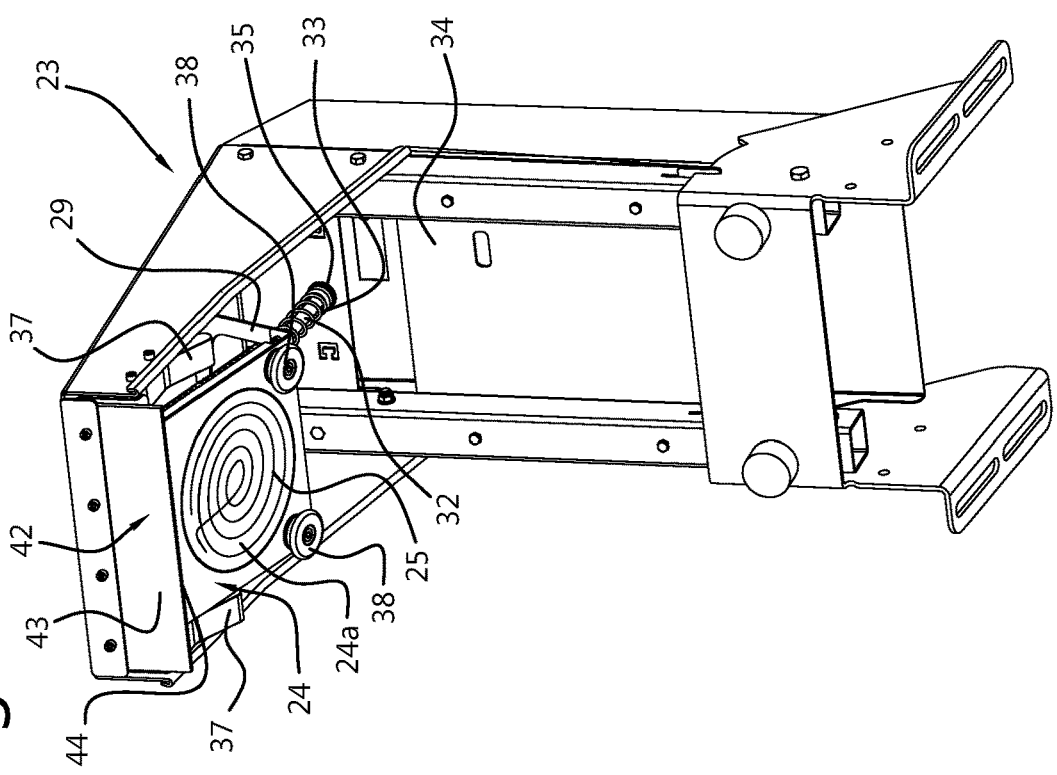

As shown in FIGS. 8 and 9, the charging station 23 comprises a transmitting body 24, which is provided with a transmitting plate 24*a* with a primary coil 25 (shown schematically in FIG. 8). The transmitting plate 24*a* is mounted adjacent to a downward facing flat surface of the transmitting body 24. The flat surface of the transmitting body 24 of the charging station 23, viewed in a direction opposite to the forward direction of travel y as the manure removing vehicle 6 enters the charging station 23, extends slanting upward relative to the horizontal.

Figure 7:
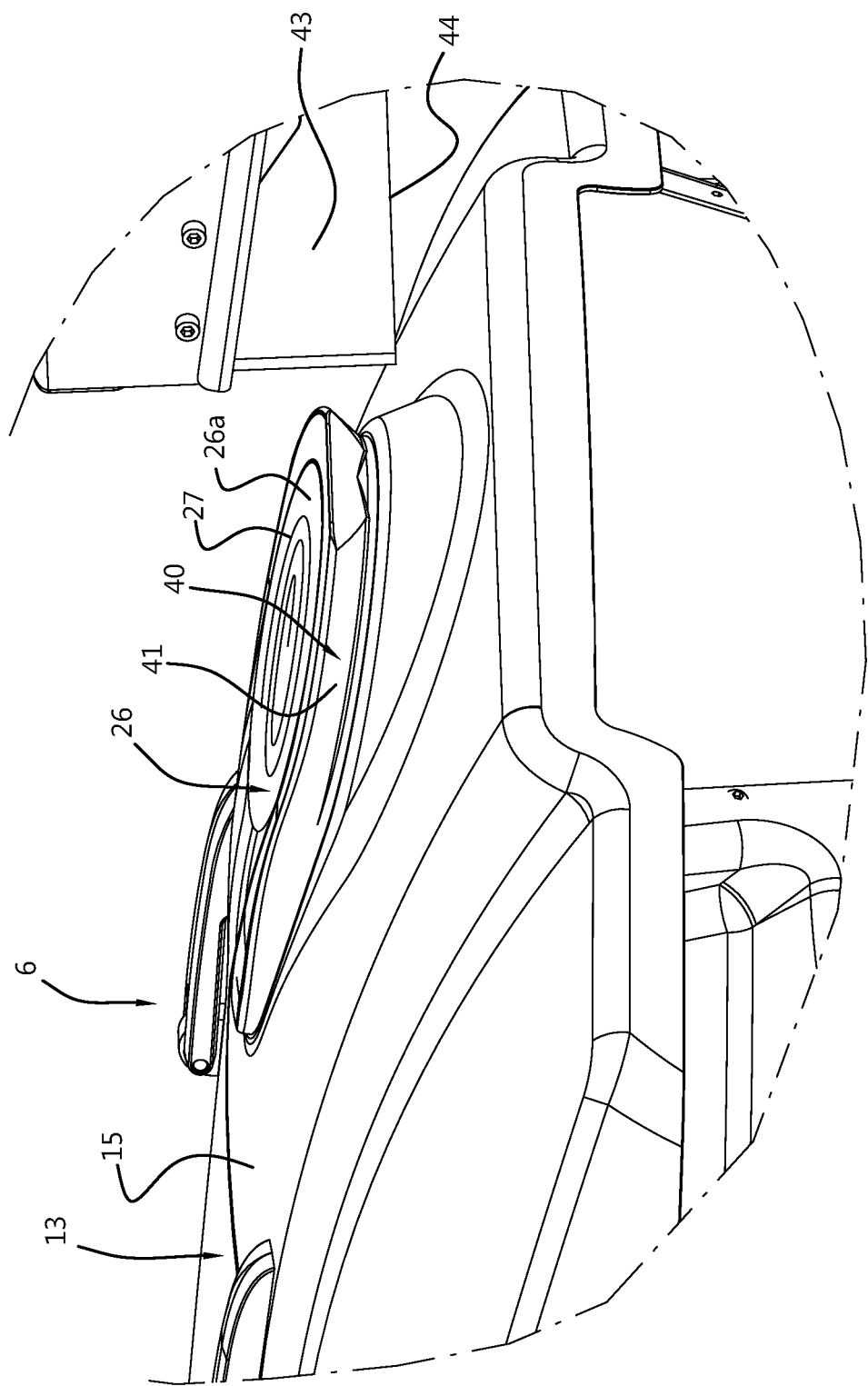
FIG. 7 shows an enlarged perspective view of the receiving body of the manure removing vehicle of the system according to FIGS. 1-6.

The manure removing vehicle 6 comprises a receiving body 26, which is provided with a receiving plate 26*a* with a secondary coil 27 (shown schematically in FIG. 7). The receiving plate 26*a* is applied adjacent to an upward facing flat surface of the receiving body 26. The flat surface of the receiving body 26 of the manure removing vehicle 6, viewed in the forward direction of travel y toward the charging station 23, extends slanting downward relative to the horizontal.

The transmitting plate 24*a* and the receiving plate 26*a* are each formed by a round disk ("charging pad"), in this exemplary embodiment with a diameter of about 16 cm and a thickness of about 2 cm. The charging pads 24*a*, 26*a* are incorporated in the transmitting body 24 and the receiving body 26. The charging pads 24*a*, 26*a* comprise the primary coil 25 or the secondary coil 27, respectively. The primary and secondary coils 25, 27 may each comprise one or more induction coils, for example a stack of induction coils.

The receiving body 26 is fastened rigidly to an upper side 13 of the manure removing vehicle 6. The upper side 13 of the manure removing vehicle 6 is defined by a substantially flattened upper surface. The receiving body 26 lies along said upper surface. At this location, the receiving body 26 is less liable to fouling and corrosion, and the risk of damage through trampling by cows is also minimal.

In this exemplary embodiment, the flattened upper surface has a somewhat rounded or round shape, but the upper surface may also define a substantially horizontal plane (not shown). The upper surface forms a portion of an outermost wall, i.e. the outer contour of the manure removing vehicle 6. The upper surface determines the height of the manure removing vehicle 6, which in this exemplary embodiment is about 60 cm.

As shown in FIG. 7, in this exemplary embodiment the receiving body 26 is mounted on the cover 15, which defines a portion of the flattened upper surface. Viewed in the vertical direction, the receiving body 26 is located directly above the interior of the housing 12. As a result, a short connection to the control system 9 and the battery system 11 is possible, while said connection in addition runs exclusively in a region that is closed off from fouling by manure, urine and the like.

Figure 4:
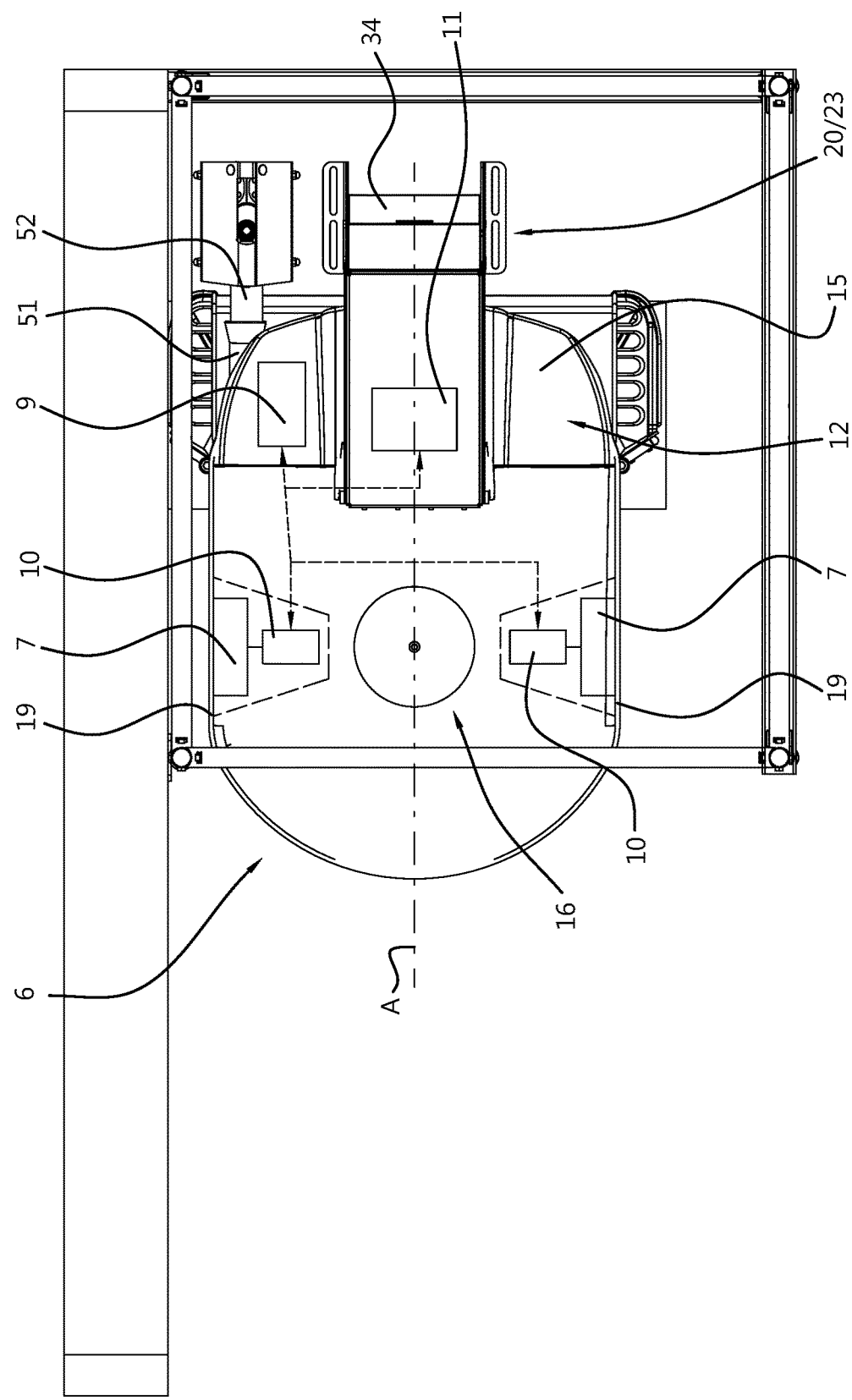
FIG. 4 shows a top view of the manure removing vehicle shown in FIG. 3 in the charging station.
Figure 5A:
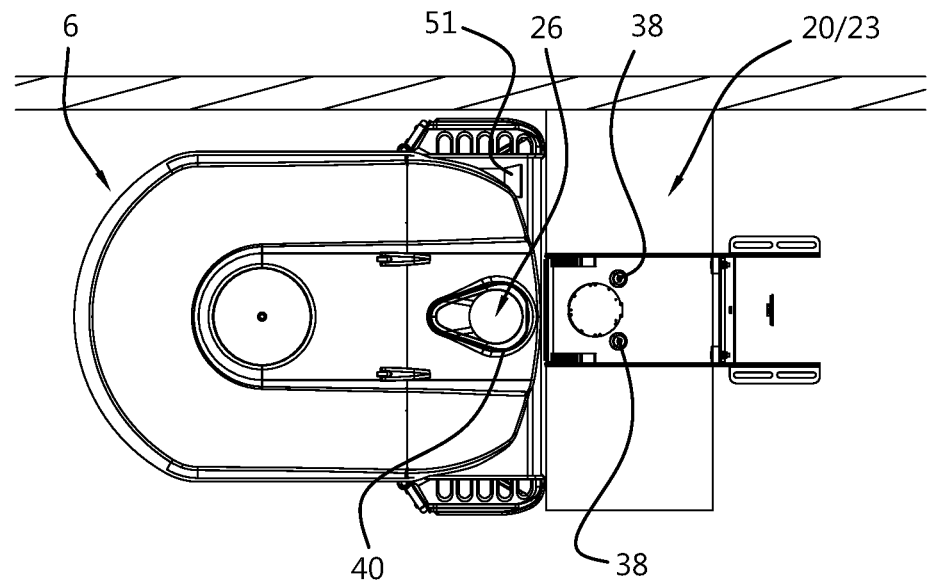
Figure 5B:
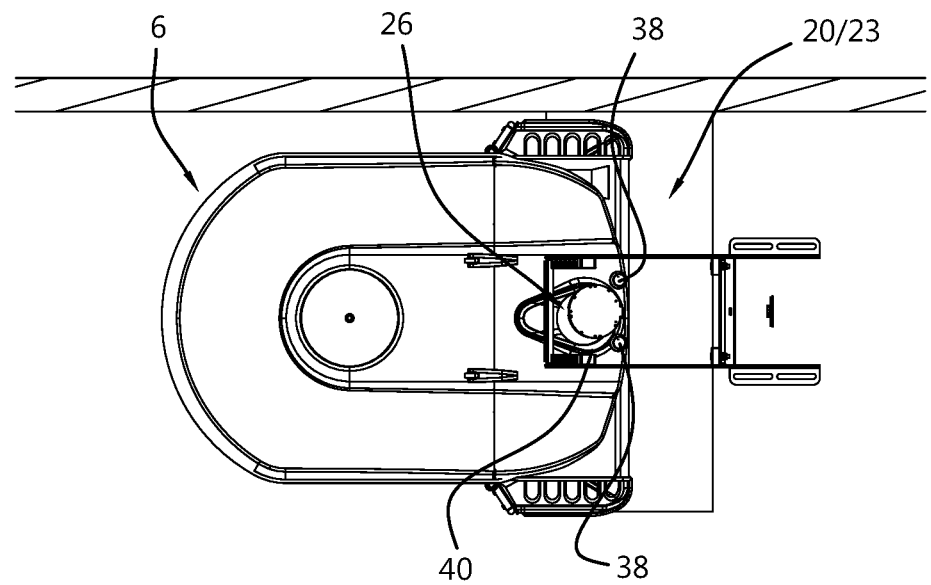
Figure 5C:
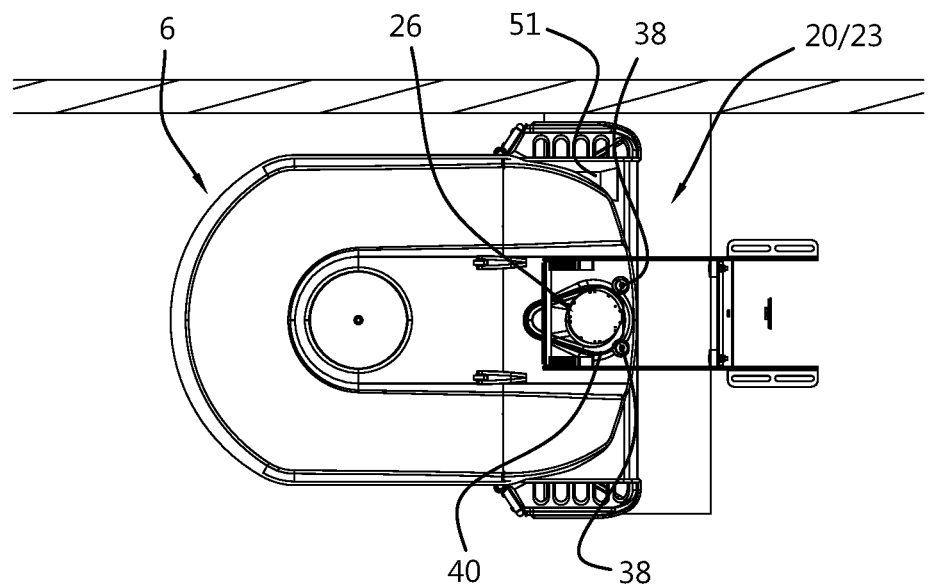
Figure 5D:
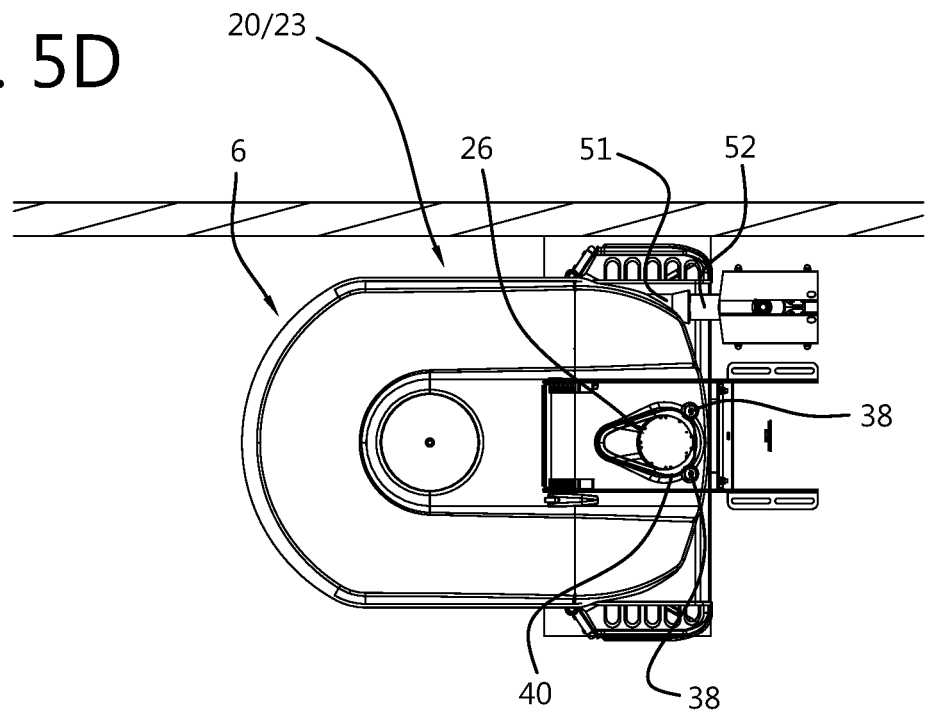
Figure 6A:
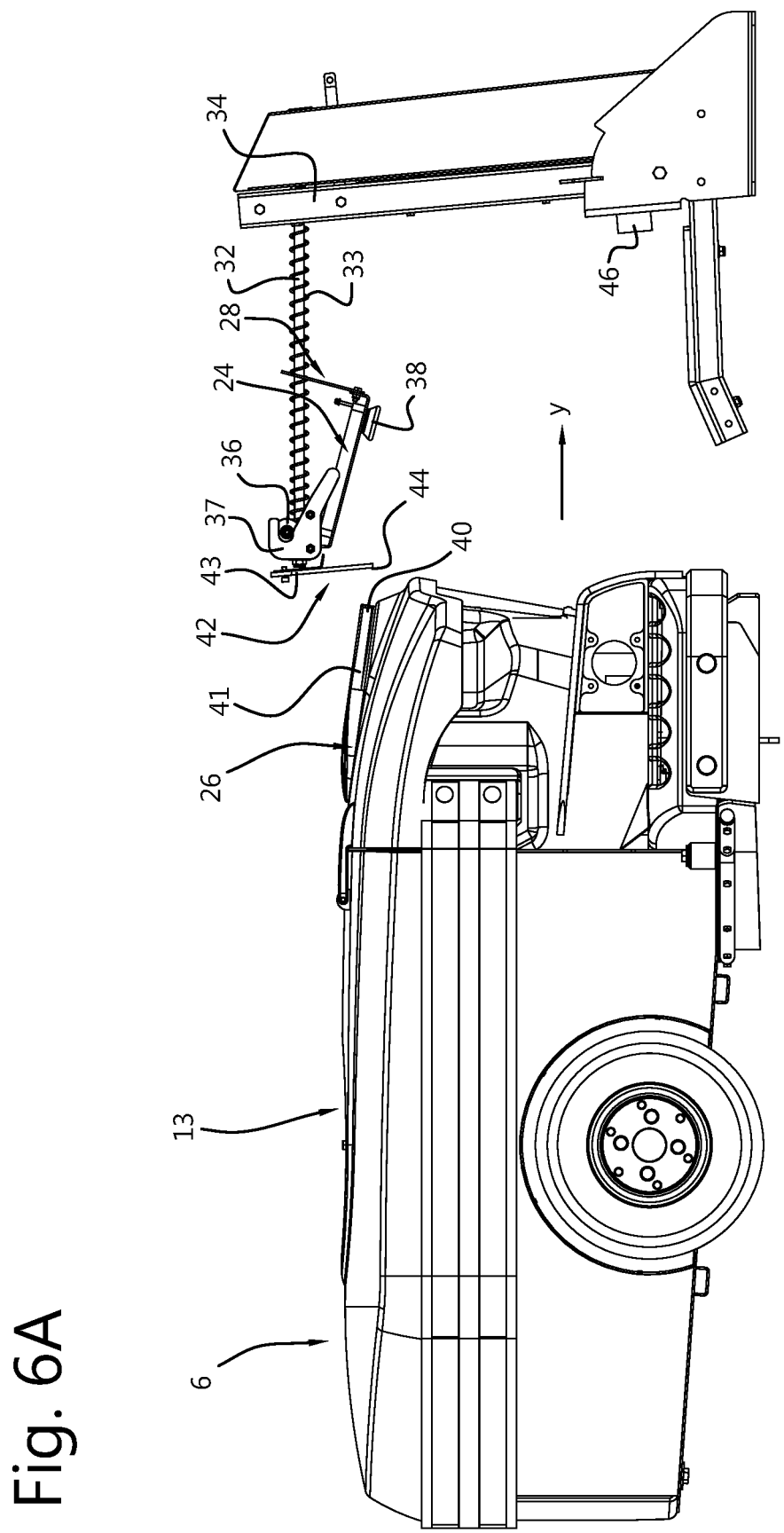
FIGS. 6A-6G show side views of various steps in aligning a primary coil of a transmitting body of the charging station relative to a secondary coil of a receiving body of the manure removing vehicle for the system shown in FIGS. 1-4, wherein the charging station is partially cut away.
Figure 6B:
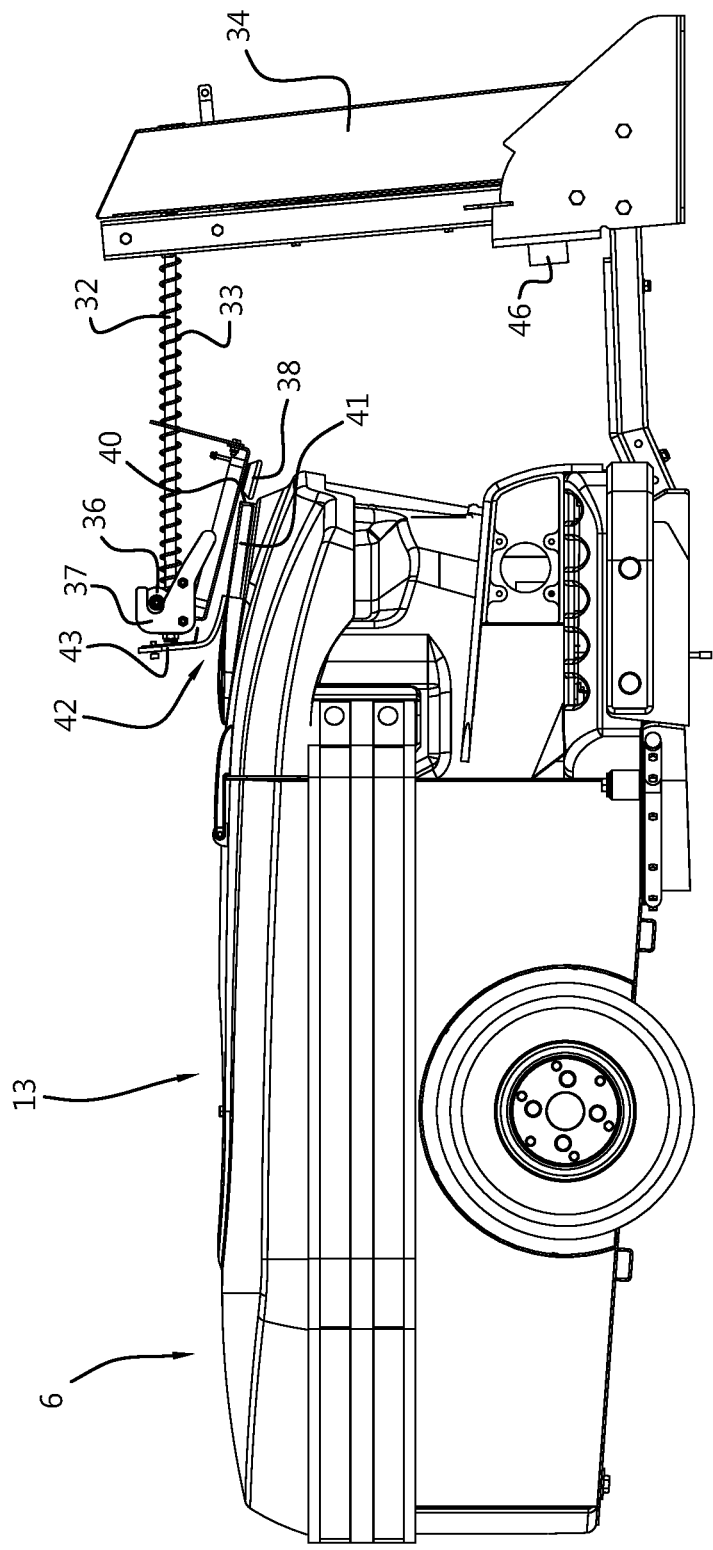
Figure 6C:
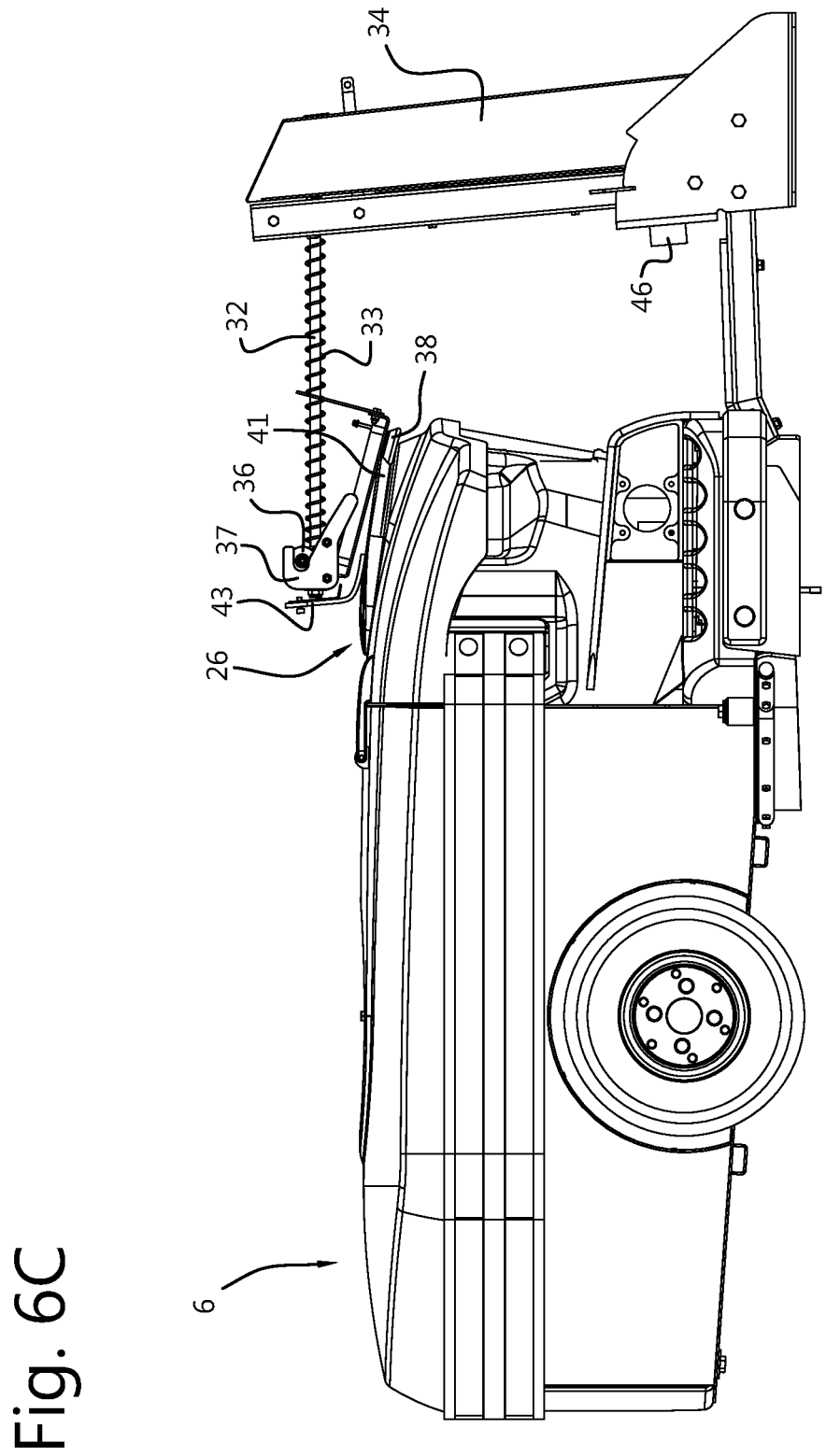
Figure 6D:
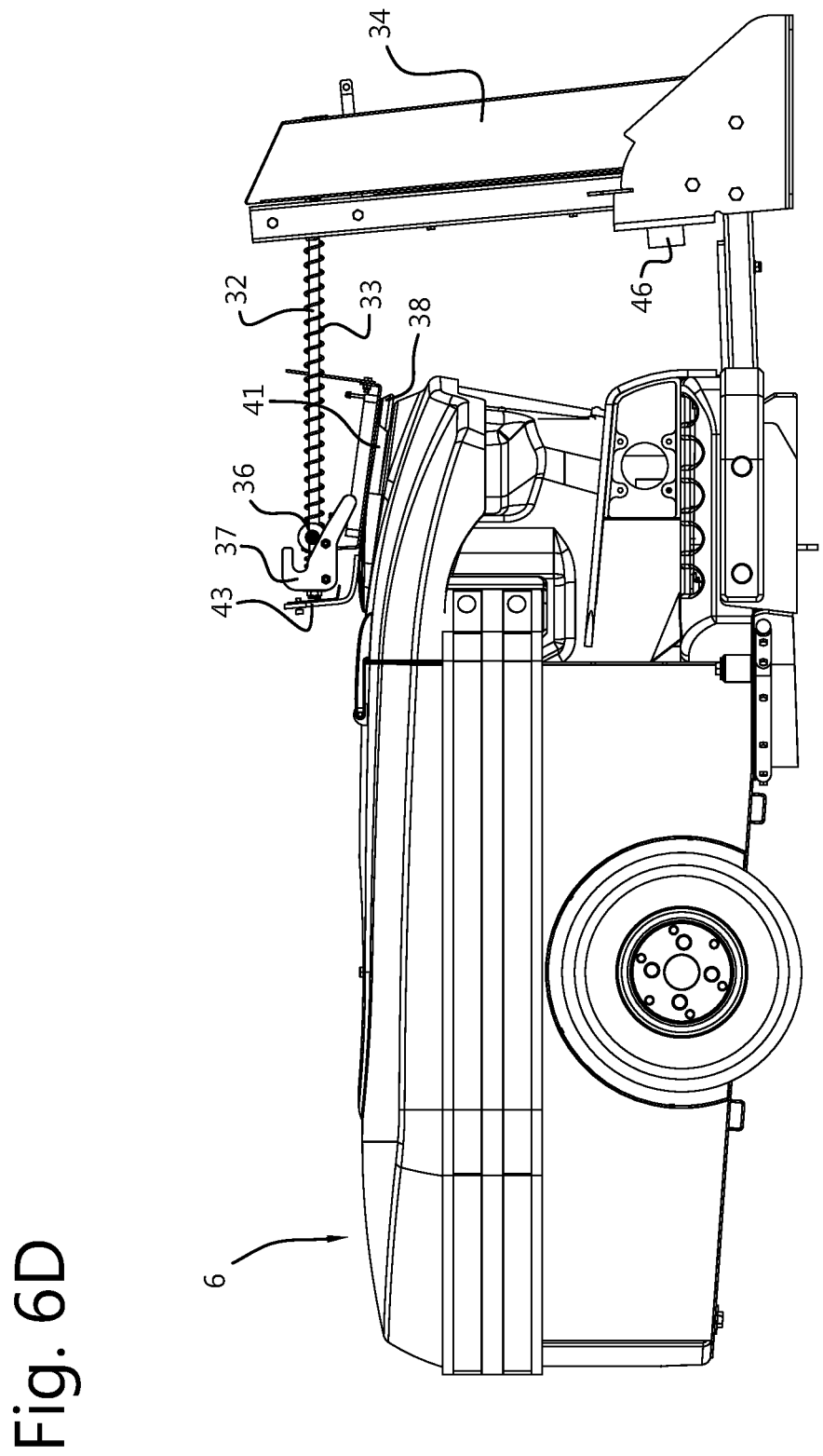
Figure 6E:
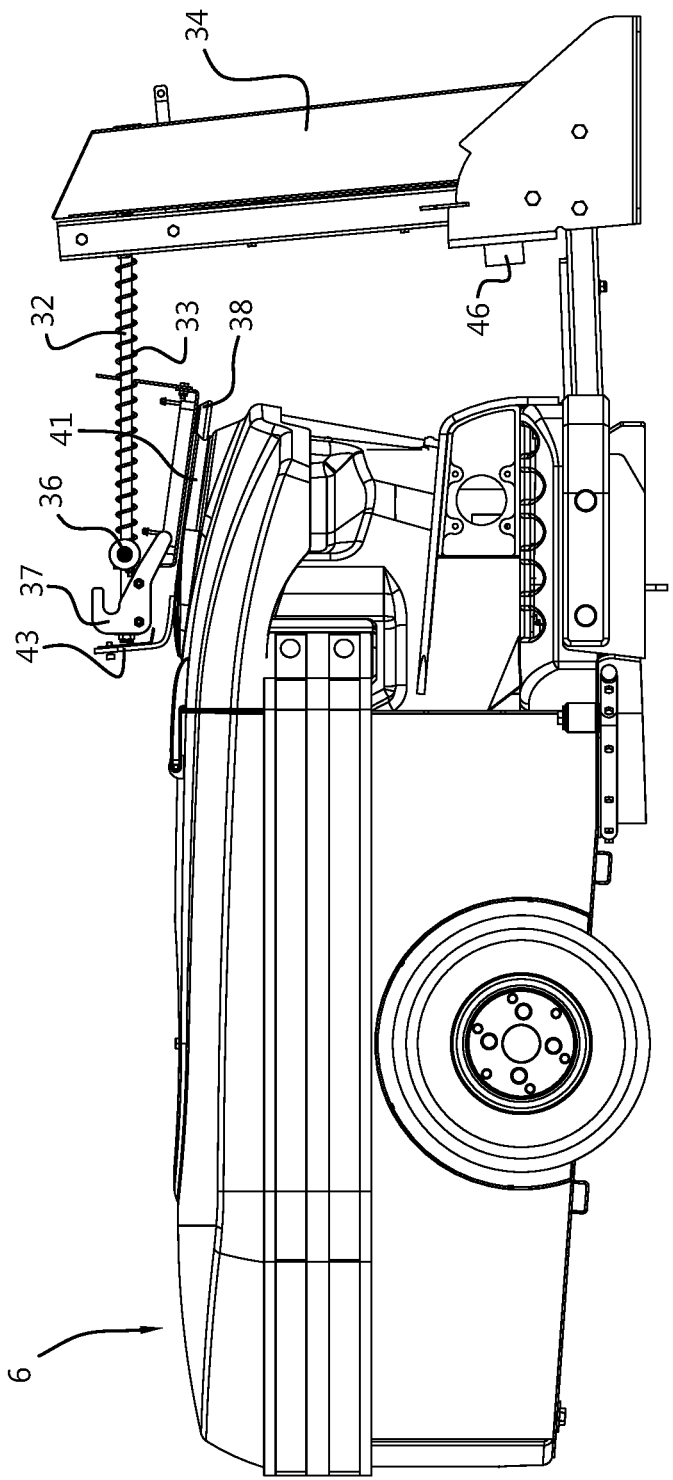
Figure 6F:
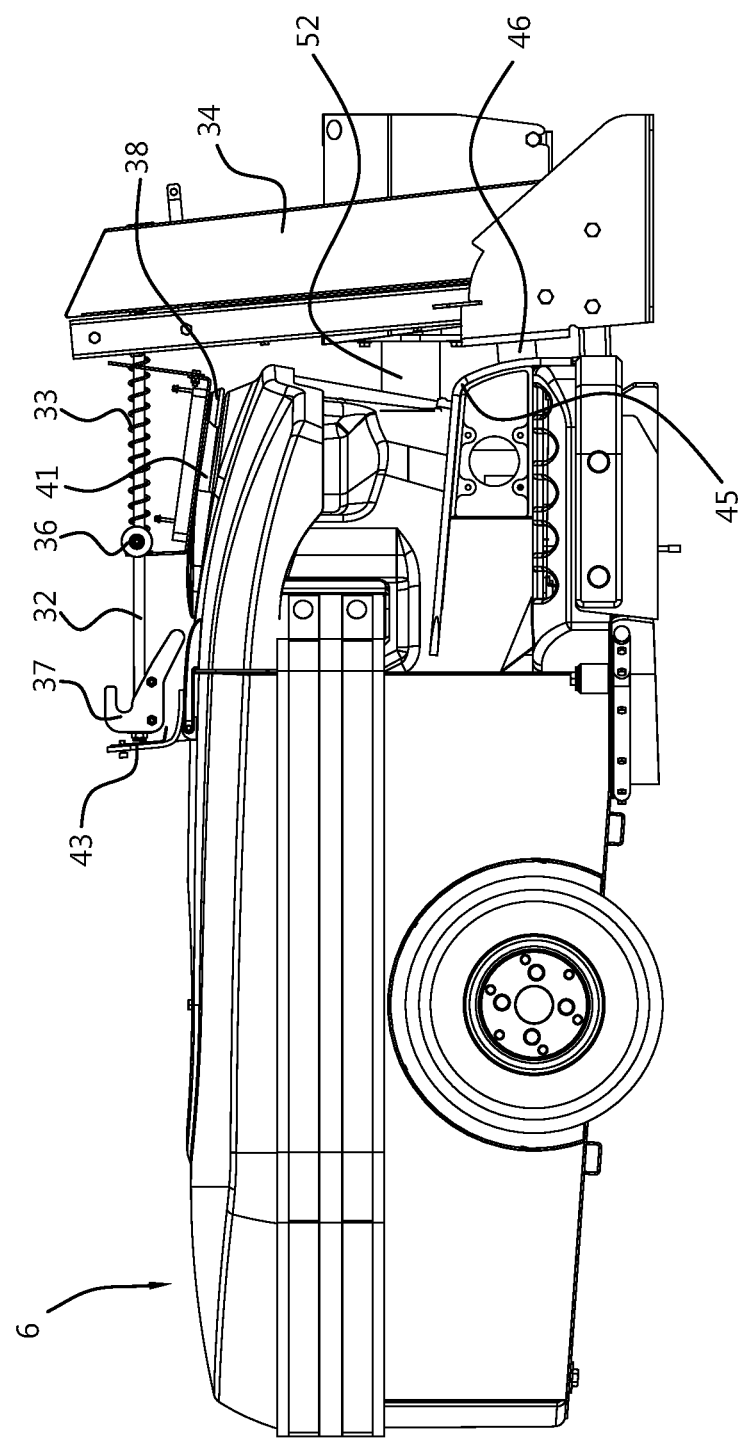
Figure 6G:
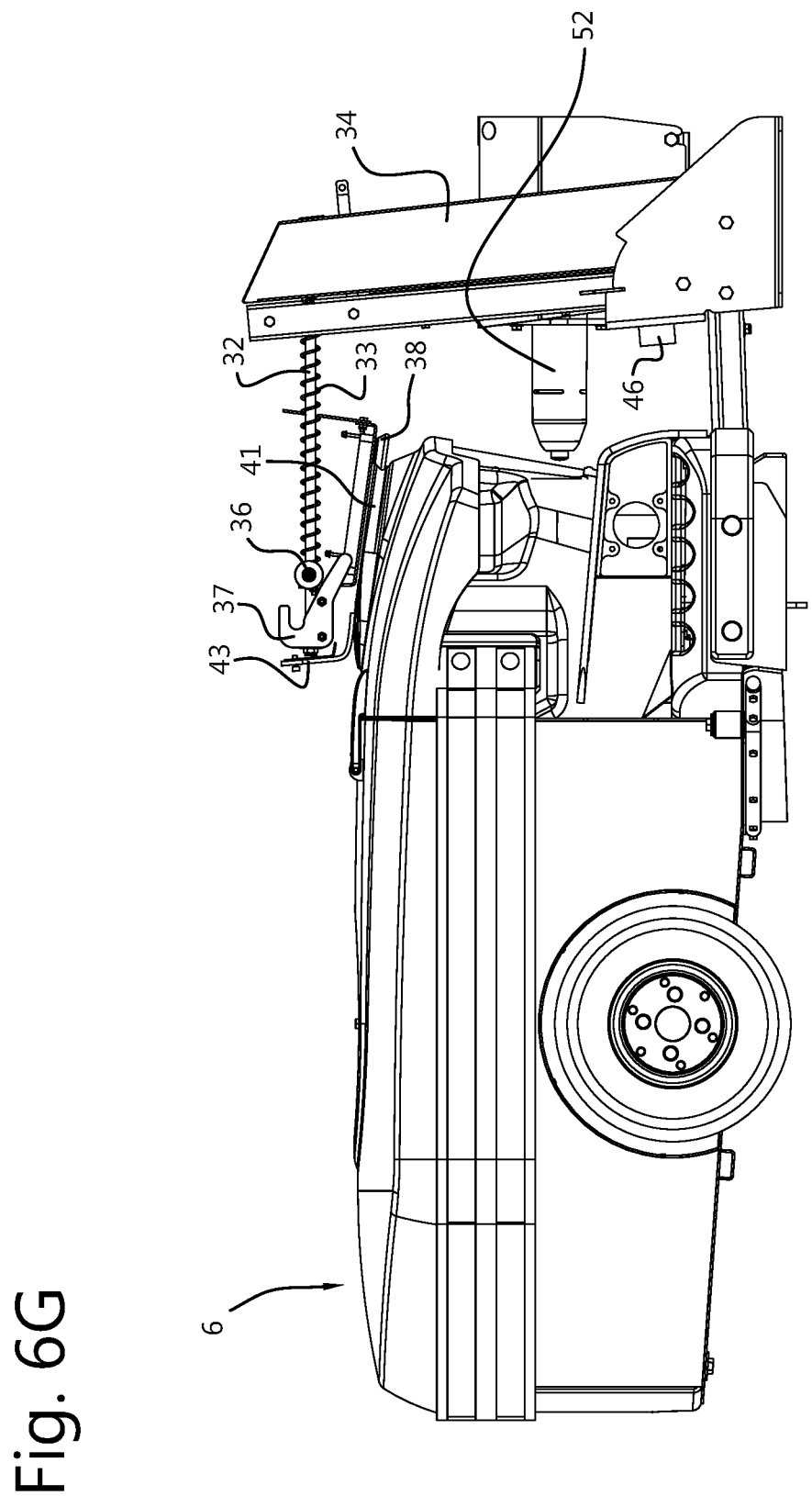

The receiving body 26 is, moreover, placed in a vertical central longitudinal plane A of the manure removing vehicle 6 (see FIG. 4). The vertical central longitudinal plane A lies centrally between the side walls 19 of the manure removing vehicle 6. In other words, the receiving body 26 is placed at the top of the manure removing vehicle 6 centrally between the side walls 19. Viewed in a direction transverse to the straight forward direction of travel y of the manure removing vehicle 6, the receiving body 26 is located in the middle of the manure removing vehicle 6.

If animals 4 relieve themselves on the upper side 13 of the manure removing vehicle 6, manure may remain thereon. In practice this manure collects in particular in elongated strips on the upper side 13 adjacent to the side walls 19. In the middle, the upper side 13 of the manure removing vehicle 6 is less fouled with manure. Consequently, the receiving body 26 in the middle of the manure removing vehicle 6 has relatively little exposure to fouling and corrosion by manure.

In order to charge the battery system 11 wirelessly, the primary coil 25 of the transmitting body 24 and the secondary coil 27 of the receiving body 26 are mutually aligned in a charging state, in which electrical energy is transferable wirelessly from the primary coil 25 to the secondary coil 27. The height of the downward facing flat surface of the transmitting body 24 is adapted to the height of the upward facing flat surface of the receiving body 26 of the manure removing vehicle 6 in such a way that these flat surfaces can be brought over and/or on each other in the charging state.

The transmitting plate 24*a* and the receiving plate 26*a* lie on top of one another in the charging state. For reliable and efficient wireless energy transfer it is desirable to position the primary coil 25 of the transmitting body 24 close to the secondary coil 27 of the receiving body 26, in particular at a distance apart of for example max. 1 or 2 cm. Alignment is shown in steps in FIGS. 5A-5D and 6A-6F, while FIGS. 7-9 illustrate further details of the receiving body 26 and the transmitting body 24.

In order to align the flat surfaces of the transmitting body 24 and the receiving body 26 reliably on top of each other, first the receiving body 26 is cleaned in order to remove most of the manure and other fouling thereon. After all, during use, the receiving body 26 of the manure removing vehicle 6 becomes (very) fouled with manure from the animals 4, often also in combination with urine, straw, sand and/or sawdust, which lie on the floor 2. After a time the manure becomes hard ("caked"). There may also be pieces or lumps in the manure. In consequence, the receiving body 26 is usually covered with a layer of manure when the manure removing vehicle 6 enters the charging station 23.

This manure renders it more difficult to arrange the flat surfaces of the transmitting body 24 and receiving body 26 on top of each other. In order to align the primary coil 25 of the transmitting body 24 and the secondary coil 27 of the receiving body 26 mutually in the charging state, in which electrical energy is transferable wirelessly from the primary coil 25 to the secondary coil 27 for wireless charging of the battery system 11, the charging station 23 comprises a cleaning device 42 for removing manure, urine and the like from the receiving body 26 while the manure removing vehicle 6 enters the charging station 23 and before the primary coil 24a of the transmitting body 24 and the secondary coil 26a of the receiving body 26 are mutually aligned in the charging state (see FIGS. 6A, 6B and 8).

Although the receiving body 26 does not have to be completely clean, the cleaning device 42 removes the fouling by manure and the like to a sufficient degree from the receiving body 26 to make it possible for the primary coil 25 of the transmitting body 24 and the secondary coil 27 of the receiving body 26 to be mutually aligned in the charging state. After cleaning by the cleaning device 42, manure or other fouling no longer impedes alignment in the charging state. Moreover, owing to the cleaning device 42, the manure removing vehicle 6 entrains considerably less manure into the charging station 23, so that the transmitting body 24 of the charging station 23 also becomes fouled less quickly.

The cleaning device 42 comprises a scraping element 43 for scraping manure from the flat surface of the receiving body 26 while the manure removing vehicle 6 travels forward in the direction of travel y into the charging station 23. The scraping element 43 is made of a flexible plastic, which in this exemplary embodiment comprises polyurethane. The scraping element 43 comprises, on the underside thereof, a scraping edge 44, which comes into contact with the flat surface of the receiving body 26 when the manure removing vehicle 6 travels under the scraping element 43 and into the charging station 23. The scraping edge 44 forms a substantially horizontal, straight bottom edge, which extends substantially transversely relative to the direction of travel y of the manure removing vehicle 6.

As the scraping edge 44 moves over the flat surface of the receiving body 26 to remove manure, elastic deformation of the scraping edge 44 occurs. During contact with the flat surface of the receiving body 26, the scraping edge 44 is bent, so that during scraping, the scraping edge 44 exerts a compressive force on the receiving body 26. Manure is removed while the bent scraping edge 44 of the scraping element 43 moves over the flat surface of the receiving body 26. When the manure removing vehicle 6 is driven away from the charging station 23 and the scraping edge 44 no longer makes contact, the scraping element 43 bends back to the original shape as shown in FIG. 8.

Optionally, the cleaning device 42 comprises a water device for application of water on the receiving body 26, which for example is configured as a water nozzle (not shown). The water nozzle sprays water on the flat surface of the receiving body 26 before the scraping element 43 scrapes over this flat surface to remove manure. By supplying water to manure that is present as fouling on the flat surface of the receiving body 26, the scraping element 43 can remove this manure more easily and more effectively.

Only after the flat surface of the receiving body 26 has been cleaned and the manure removing vehicle 6 has then driven further into the charging station (see FIGS. 5B and 6C), the receiving body 26 of the manure removing vehicle 6 engages on the transmitting body 24 of the charging station 23, which is in a waiting state or initial state. The receiving body 26 of the manure removing vehicle 6 then comes into contact with the transmitting body 24 of the charging station 23.

The transmitting body 24 is pretensioned to the waiting state by means of a spring 33. As shown in FIGS. 8 and 9, the transmitting body 24 is fastened to a slide 28 of the charging station 23, which is suspended movably on a carrying bar 32 at a height above the floor 2. In this exemplary embodiment, the slide 28 comprises a carrying bracket 29 and a supporting plate 30 with an opening 31. The carrying bar 32 passes with clearance through the opening 31, under the carrying bracket 29, and is received with clearance in an opening 35 of a carrying frame 34 of the charging station 23. As a consequence of this clearance in the opening 35 of the carrying frame 34, the carrying bar 32 is somewhat tiltable relative to the carrying frame 34.

On either side of the carrying bar 32, the slide 28 comprises in each case a bush 36. The bushes 36 are receivable in receiving jaws 37, which are fastened to the carrying frame 34. The receiving jaws 37 form a front stop for the slide 28 with the transmitting body 24 fastened thereon. The front stop determines a front position for the transmitting body 24. During alignment, the slide 28 is movable over a distance backwards to a rearmost position, which is defined in that the manure removing vehicle 6 cannot travel further than until a bumper 45 on the front of the manure removing vehicle 6 comes into contact with a stop of the charging station 23, which in this exemplary embodiment is formed by two buffers 46 (see FIGS. 6F and 8).

The spring 33 is pushed onto the carrying bar 32 and is pretensioned between the supporting plate 30 and the carrying frame 34, so that the bushes 36 of the slide 28 are received in the receiving jaws 37 with a pretensioning force. The transmitting body 24 is then in the waiting state. The transmitting body 24 consequently always returns to the same accurately defined position when the manure removing vehicle 6 has left the charging station 23. As a result, during alignment the transmitting body 24 always begins at the same position that corresponds to the waiting state.

The transmitting body 24 is substantially freely movable from the waiting state, against the action of the spring 33. "Freely movable" is understood to mean that the transmitting body 24, on moving from the front position, which is determined by the front stop formed by the receiving jaws 37, to the rearmost position, which is determined by contact of the manure removing vehicle 6 against the buffers 46, is movable relative to the carrying frame 34 of the charging station 23 to adjust the position and orientation of the transmitting body 24 to the receiving body 26 of the manure removing vehicle 6 while the manure removing vehicle 6 enters the charging station 23 and the receiving body 26 engages on the transmitting body 24.

The transmitting body 24 may perform a motion of translation in the direction of travel y, so that the bushes 36 are released from the receiving jaws 37. The transmitting body 24 may also perform a motion of translation in a direction transverse to the direction of travel y, i.e. to the left and right. Furthermore, the transmitting body 24 may swivel to the left and right about a substantially vertical swivel axis through displacement of the carrying bracket 29 over the carrying bar 32, and rotate slightly to the left and right about the carrying bar 32.

The transmitting body 24 further comprises two centering bosses 38, which are arranged on either side of the carrying bar 32. The centering bosses 38 are located in angular regions to the left and right of the transmitting body 24, so that the flat surface that is contiguous with the transmitting plate 24a remains free, i.e. the flat surface of the receiving body 26 can be applied thereto. The centering bosses 38 have an undercut shape. The undercut shape prevents the transmitting body 24 going beyond the receiving body 26 while the manure removing vehicle 6 travels forward into the charging station 23 in the direction of travel y.

As shown in FIG. 7, the receiving body 26 comprises, on a front side thereof, a centering edge 40, which projects upward, substantially transversely from the cover 15 of the manure removing vehicle 6. The centering edge 40 forms a vertical collar, which partially surrounds the receiving plate 26a. Viewed in a direction opposite to the forward direction of travel y, i.e. backward from the front of the manure removing vehicle 6, the centering edge 40 on either side of the central axis of the receiving plate 26a runs away in an outward direction. In this exemplary embodiment the centering edge 40 has roughly the shape of a semicircle at the front of the receiving body 26. As a result, the centering edge 40 is self-aligning. The centering edge 40 further comprises a groove 41, which is configured to interact with the undercut centering bosses 38 of the transmitting body 24.

The height of the groove 41 of the centering edge 40 of the receiving body 26 and the height of the centering bosses 38 of the transmitting body 24 are matched to each other, i.e. as the manure removing vehicle 6 enters the charging station 23, the centering edge 40 first comes into contact with at least one of the centering bosses 38 of the transmitting body 36 in the waiting state. The undercut shape of this centering boss 38 is received in the groove 41, so that the transmitting body 24 does not shoot back over the receiving body 26 to the waiting state (see FIGS. 5B and 6C). With further travel of the manure removing vehicle 6, the other centering boss 38 also engages in the groove 41 (see FIG. 5C). In other words, the groove 41 of the centering edge 40 is caught by the centering bosses 38 of the transmitting body 24. The centering bosses 38 then engage in the groove 41 of the centering edge 40 on either side of the central axis of the receiving plate 26a. Because the centering edge 40 is of semicircular shape, the transmitting body 24 is self-aligning, i.e. the transmitting body 24 performs a motion of translation sideways, i.e. transversely to the direction of travel y, for accurate alignment.

By means of the centering bosses 38, the centering edge 40 forces the transmitting body 24 out of the waiting state, against the action of the pretension. The bushes 36 then move from the receiving jaws 37 and down over tracks or paths 39, while the carrying bar 32 tilts slightly downward relative to the opening 35 in the carrying frame 34 (see FIG. 6D). As a result, the flat surface of the transmitting body 24 also tilts against the flat surface of the receiving body 26, so that the transmitting plate 24a and the receiving plate 26a end up being substantially parallel to each other. The manure removing vehicle 6 is thereby maneuvered under the transmitting body 24 of the charging station 23 in such a way that the primary coil 25 of the transmitting body 24 is aligned in the charging state above the secondary coil 27 of the receiving body 26.

Since the transmitting body 24 is moved against the action of the pretension, the flat surfaces of the transmitting body 24 and receiving body 26 are pressed against each other in the charging state. Also owing to the weight of the slide 28 with the transmitting body 24, the flat surface of the transmitting body 24 "falls" firmly against the flat surface of the receiving body 26.

If the manure removing vehicle 6 travels further after reaching the charging state, the flat surfaces of the transmitting body 24 and the receiving body 26 remain lying on each other, while the slide 28 with the transmitting body 24 slides further over the carrying bar 32 in the direction of travel y. The bushes 36 then become free from the tracks 39 (see FIG. 6E). As mentioned above, the manure removing vehicle 6 may continue its travel until the bumper 45 at the front thereof comes into contact with the two buffers 46 of the carrying frame 34 of the charging station 23 (see FIGS. 6F and 8).

Figure 3:
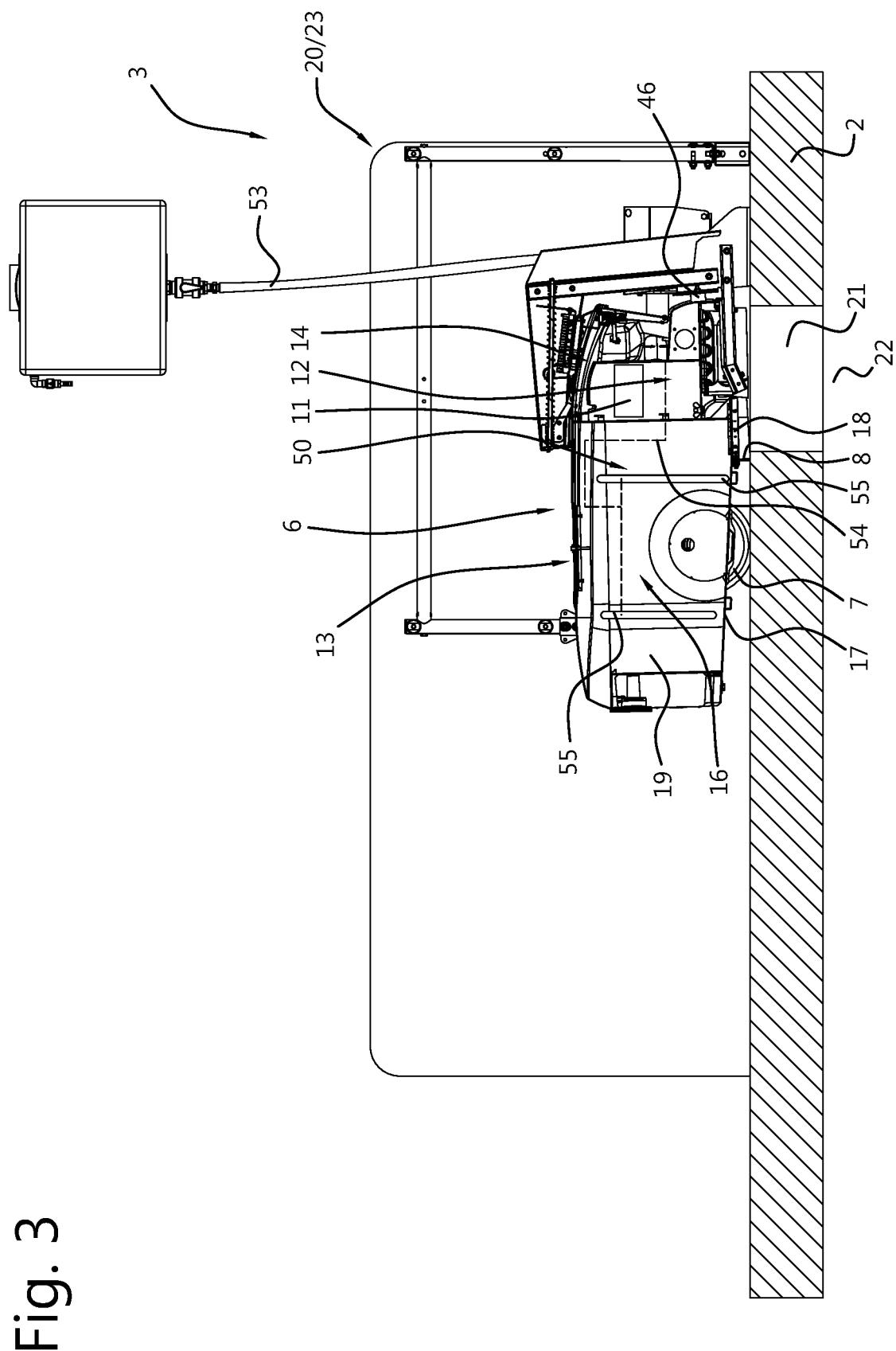
FIG. 3 shows a partially cut-away side view of the manure removing vehicle shown in FIG. 2 in the charging station.

The manure removing vehicle 6 further comprises a water system 50, which is configured for spraying water on the floor 2 (shown schematically in FIG. 3). It is beneficial to wet the floor 2 to promote removal of manure from the floor 2. The water system 50 is optional. As can be seen in FIG. 4, in this exemplary embodiment the water system 50 comprises a water feed connection 51 for feeding water to the water system 50. The water feed connection 51 is couplable to a water supply connection 52, which is located at the charging station 23. The water supply connection 52 is for example connected to a water main 53 or a water buffer tank (not shown).

The water feed connection 51 of the manure removing vehicle 6 is connected by means of a pipe system 54 to two water reservoirs 55 for receiving water. In this exemplary embodiment the water reservoirs 55 are formed as flexible water bags, as is also described in WO 2017/069615 A1. In FIG. 3 the water bags 55 are not filled with water and so are substantially flat. When the water bags 55 are filled with water, the volume of the water bags 55 increases. Obviously it is possible to use just one water reservoir, and the water reservoir may be configured differently, for example as a plastic or metal tank (not shown).

By means of the pipe system 54, the water reservoirs 55 are further connected to one or more spray heads for spraying water on the floor 2 (not shown). For example, a spray head of the water system 50 is fitted on a front side of the manure removing vehicle 6, wherein this spray head sprays water on the floor 2 in front of the manure removing vehicle 6 while the manure removing vehicle 6 travels forward. In other words, this spray head always sprays water on an area of the floor 2 onto which the manure removing vehicle 6 travels. Furthermore, the water system 50 may comprise a further spray head, which for example is configured to spray water on the area of the floor 2 behind the manure removing vehicle 6.

The water supply connection 52 is omitted in FIGS. 5A-5C and 6A-6E, but is shown in FIGS. 5D, 5E, 6F and 6G, which show the manure removing vehicle 6 during charging of the battery system 11 during and after filling of the water reservoirs 55. The water supply connection 52 of the charging station 23 and the water feed connection 51 of the manure removing vehicle 6 are coupled automatically to supply water to the water system 50 when the manure removing vehicle 6 enters the charging station 23. On coupling of the water feed connection 51 of the manure removing vehicle 6 to the water supply connection 52 of the charging station 23, the water coupling opens automatically so that water is fed to the water reservoirs 55 of the manure removing vehicle 6. The water coupling comprises for example a mechanically controllable valve device (not shown). While the manure removing vehicle 6 is being charged in the charging station 23, the water system 50 can be filled with water.

The water supply connection 52 is installed in such a way that as the manure removing vehicle 6 travels forward into the charging station 23, water coupling only takes place after the primary coil 25 of the transmitting body 24 and the secondary coil 27 of the receiving body 26 are mutually aligned in the charging state. In other words, as the manure removing vehicle 6 enters the charging station 23, first the charging state is reached, and then the manure removing vehicle 6 continues to travel forward into the charging station 23, so that water coupling takes place automatically for supplying water to the water reservoirs 55. The charging state is maintained, even if the manure removing vehicle 6 abuts against the buffers 46 (see FIGS. 5D and 6F).

Water is supplied for as long as the coupling between the water feed connection 51 of the manure removing vehicle 6 and the water supply connection 52 is maintained. After the water reservoirs 55 have been substantially completely filled with water, the water feed connection 51 of the manure removing vehicle 6 is decoupled by travelling back a small distance, for example about 10-15 cm, within the charging station 23. The connection to the water supply connection 52 of the charging station 23 is then broken, so that the water coupling closes automatically. The charging state is maintained during the backward travel of the manure removing vehicle 6 (see FIGS. 5E and 6G).

Charging of the battery system 11 takes much longer than filling of the water reservoirs 55. If the water coupling were to be maintained for the complete charging time, there would be a risk of water wastage through leakage. By making it possible for the water feed connection 51 to be decoupled from the water supply connection 52 while wireless charging is in progress, the risk of high water consumption through leakage is practically excluded.

After the control system 9 has detected that the battery system 11 is charged sufficiently, the manure removing vehicle 6 travels out of the charging station 23. In this exemplary embodiment the manure removing vehicle 6 first moves back further, and then turns sideways away from the charging station 23. When the manure removing vehicle 6 has left the charging station 23, the transmitting body 24 is returned to the waiting state as a result of the pretension of the spring 33. The transmitting body 24 is then relocated in this waiting state in the same accurately defined position. Whenever the battery system 11 of the manure removing vehicle 6 (or of a second or further manure removing vehicle) has to be charged, alignment can take place reliably.

The invention is not limited to the exemplary embodiment shown in the figures. A person skilled in the art can make various adjustments that are within the scope of the invention. In particular the manure feed device of the manure removing vehicle may be configured differently. Instead of sucking up manure as described above, the manure feed device may comprise a mechanical scooping mechanism for scooping up manure from the floor. It is also possible for the manure removing vehicle to comprise two separate openings for feed or discharge of manure, respectively, i.e. a manure feed opening and a manure discharge opening. The manure is then for example moved upward by means of a rotary feed, and goes via the manure feed opening into the interior of the manure storage container. The manure can be discharged via the manure discharge opening. With a manure removing vehicle of this kind, a water system may also optionally be used for wetting the floor as described above.

Although only a manure removing vehicle is depicted in the figures, the invention as described in the claims may further also be applied to other autonomous vehicles for carrying out an animal-related operation, such as with an autonomous vehicle for feeding animals, in particular for mowing grass and then feeding the mown grass to animals, or an autonomous vehicle for pushing feed to a feed fence that extends for example in a barn.

The invention claimed is:

1. A system for carrying out an animal-related operation, said system comprising:
    an autonomous vehicle, comprising:
        a drive system for driving the vehicle, said drive system being provided with at least one electric drive motor;
        an electronic control system connected to the drive system for control thereof,
        a battery system for storing electrical energy, said battery system being connected to the drive system and the control system; and
        a charging station for charging the battery system of the vehicle,
    wherein the charging station comprises a transmitting body with a primary coil, and the vehicle comprises a receiving body with a secondary coil,
    wherein the system is configured for removing manure from a floor in a barn for animals,
    wherein the vehicle is provided with a manure storage container, a manure discharge opening for discharging manure from the manure storage container, and a manure feed device for feed of manure from the floor and moving the fed-in manure to the manure storage container,
    wherein the vehicle is maneuverable relative to the transmitting body of the charging station in such a way that the primary coil of the transmitting body and the secondary coil of the receiving body are mutually aligned in a charging state in order to transfer electrical energy wirelessly from the primary coil to the secondary coil for wireless charging of the battery system of the vehicle, and
    wherein the system comprises a cleaning device for cleaning at least the receiving body of the vehicle, before the primary coil of the transmitting body and the secondary coil of the receiving body are mutually aligned in the charging state.

2. The system as claimed in claim 1, wherein the cleaning device is mounted on the charging station.

3. The system as claimed in claim 1, wherein the cleaning device is configured for cleaning the receiving body while the vehicle travels into the charging station.

4. The system as claimed in claim 3, wherein the receiving body is fastened rigidly to the vehicle,
    wherein the transmitting body of the charging station is movable from a waiting state through engagement with the receiving body of the vehicle that travels into the charging station, in such a way that the primary coil of the transmitting body and the secondary coil of the receiving body are mutually aligned in the charging state, and
    wherein the cleaning device is configured for cleaning the receiving body before the receiving body of the vehicle engages on the transmitting body of the charging station.

5. The system as claimed in claim 1, wherein the cleaning device is configured for cleaning the receiving body, in such a way that the primary coil of the transmitting body and the secondary coil of the receiving body in the charging state are movable to a distance apart that is less than 5 cm.

6. The system as claimed in claim 1, wherein the receiving body of the vehicle comprises a flat surface, which in the charging state faces the transmitting body of the charging station, and
   wherein the cleaning device is configured for cleaning at least the flat surface of the receiving body.

7. The system as claimed in claim 6, wherein the receiving body is arranged on an upper side of the vehicle and the flat surface of the receiving body faces upward, and
   wherein the transmitting body of the charging station comprises a downward facing flat surface at a height that is adjusted to the height of the upward facing flat surface of the receiving body of the vehicle in such a way that said flat surfaces are movable over and/or on each other into the charging state.

8. The system as claimed in claim 1, wherein the cleaning device comprises a scraping element for scraping the receiving body.

9. The system as claimed in claim 8, wherein the scraping element comprises a flexible scraping edge configured to be in contact with the receiving body during scraping of the receiving body.

10. The system as claimed in claim 9, wherein the scraping element is made of a flexible plastic.

11. The system as claimed in claim 8, wherein the scraping element is fastened to the charging station, and
    wherein the scraping element is configured for cleaning the receiving body while the vehicle travels into the charging station, before the receiving body of the vehicle and the transmitting body of the charging station are positioned relative to each other to align the primary coil and the secondary coil in the charging state.

12. The system as claimed in claim 1, wherein the cleaning device comprises a water device for application of water on the receiving body.

13. The system as claimed in claim 1, wherein the vehicle comprises a manure slider for moving manure over the floor.

14. The system as claimed in claim 1, wherein the charging station is provided with a dump opening in the floor for dumping manure from the manure discharge opening of the manure storage container through the dump opening to a manure reservoir that extends underneath the floor.

15. In combination, a barn for keeping animals, and the system as claimed in claim 1.

16. The system as claimed in claim 9, wherein the scraping element is made of polyurethane.

17. The system as claimed in claim 2, wherein the cleaning device is configured for cleaning the receiving body while the vehicle travels into the charging station.

18. A process of use of the system as claimed in claim 1, the process comprising:
    moving the autonomous vehicle over a floor in a barn;
    moving the vehicle to the charging station; and
    maneuvering the vehicle relative to the transmitting body of the charging station in such a way that the primary coil of the transmitting body and the secondary oil of the receiving body are mutually aligned in a charging state to transfer electrical energy wirelessly from the primary coil to the secondary coil for wireless charging of the battery system of the vehicle, whereby at least the receiving body of the vehicle is cleaned by the cleaning device before the primary coil of the transmitting body and the secondary coil of the receiving body are mutually aligned in the charging state.

\* \* \* \* \*